(12) United States Patent
Anderson et al.

(10) Patent No.: US 6,702,229 B2
(45) Date of Patent: Mar. 9, 2004

(54) METHOD, APPARATUS AND ARTICLE TO DISPLAY FLIGHT INFORMATION

(76) Inventors: Norman G. Anderson, 11005 Waycroft Way, Rockville, MD (US) 20852; Douglas Huff, 2510 30th Ave. West, Seattle, WA (US) 98199; Elizabeth A. Anderson, 2510 30th Ave. West, Seattle, WA (US) 98199

( * ) Notice: Subject to any disclaimer, the term of this patent is extended or adjusted under 35 U.S.C. 154(b) by 0 days.

(21) Appl. No.: 10/215,221

(22) Filed: Aug. 7, 2002

(65) Prior Publication Data

US 2003/0127557 A1 Jul. 10, 2003

Related U.S. Application Data

(60) Provisional application No. 60/311,021, filed on Aug. 8, 2001.

(51) Int. Cl.[7] .............................................. G01C 23/00
(52) U.S. Cl. ...................... 244/1 R; 346/975; 346/945; 244/118.5; 340/973
(58) Field of Search .............................. 244/1 R, 118.5; 345/7, 205, 200; 296/21; 701/1–19; 340/973, 974, 980

(56) References Cited

U.S. PATENT DOCUMENTS

| | | | | |
|---|---|---|---|---|
| 3,475,958 A | * | 11/1969 | Sabadishin | 73/180 |
| 4,027,620 A | * | 6/1977 | Kirsch | 116/202 |
| 4,230,290 A | * | 10/1980 | Townsend et al. | 244/1 R |
| 4,319,219 A | * | 3/1982 | Rein-Weston | 340/968 |
| 4,688,029 A | * | 8/1987 | Kawasaki et al. | 345/40 |
| 4,773,015 A | * | 9/1988 | Leland et al. | 701/15 |
| 5,059,970 A | * | 10/1991 | Raubenheimer et al. | 340/995.26 |
| 5,067,667 A | * | 11/1991 | Shivers, Jr. | 244/1 R |
| 5,089,816 A | * | 2/1992 | Holmes, Jr. | 340/995.26 |
| 5,134,394 A | * | 7/1992 | Beadle | 340/975 |
| 5,544,842 A | * | 8/1996 | Smith et al. | 244/1 R |
| 5,668,542 A | * | 9/1997 | Wright | 340/971 |
| 5,715,163 A | * | 2/1998 | Bang et al. | 701/202 |
| 5,971,318 A | * | 10/1999 | Lustre | 244/1 R |
| 6,038,498 A | * | 3/2000 | Briffe et al. | 701/3 |
| 6,112,141 A | * | 8/2000 | Briffe et al. | 701/14 |
| 6,179,452 B1 | * | 1/2001 | Dunning | 362/470 |
| 6,255,964 B1 | * | 7/2001 | Steele, Jr. | 340/945 |
| 6,264,146 B1 | * | 7/2001 | Hill et al. | 244/234 |
| 6,342,846 B1 | * | 1/2002 | Argentieri | 340/977 |

* cited by examiner

*Primary Examiner*—Charles T. Jordan
*Assistant Examiner*—Stephen A. Holzen
(74) *Attorney, Agent, or Firm*—Seed IP Law Group PLLC

(57) ABSTRACT

Flight information is displayed using visual indications that resemble real world visual cues. For example, left and right side attitude displays extend vertically along each side of the windshield and a yaw display extends along a lower edge of the windshield. The attitude displays employ reference indications and outermost indications which track the position of the actual horizon. The yaw display employs outermost indications spaced from a reference indication a distance proportional to the rate of turn. Indexing of indications between the references and the outermost indications provides the appearance of movement representing climb, descent and turns. The rate and direction of indexing may be proportional to the rate and direction of change. Alternatively, indications such as lines are presented on a display screen, the lines being vertically displaced from a reference to represent angle of attack, slanted or angled to indicate the degree and direction of bank, and indexed to create the appearance of movement representing climb, descent and turns.

53 Claims, 11 Drawing Sheets

METHOD, APPARATUS AND ARTICLE TO DISPLAY FLIGHT INFORMATION

BACKGROUND OF THE INVENTION

1. Technical Field

The present invention is generally related to flight instrumentation, and more particularly to the display of flight information in a cockpit of an aircraft.

2. Background of the Invention

The visual cues used for situational awareness in ordinary activities and in clear-day flight are continuously obtained without training or conscious attention, and processed by a complex native neural processing network that can detect motion instantly without fixing on the moving object, and can then, in parallel, break complex images down into elements that are then processed separately. The first component of this system is the neural network covering the surface of the retina itself, in which signals from adjacent rods and cones are instantly inter-compared to detect motion anywhere in the entire field of vision without eye movement. Movement-detection signals and visual image data are then transmitted to the brain separately. The image data is further broken down and evaluated in separate brain regions. For example, detection and evaluation of parallelism between lines, or evaluation of geometric shapes including recognition of faces or instrument dials, are all done separately. The movement data and processed image data are then continuously coordinated to produce a largely subconscious dynamic mental image of position and movement in space. This occurs rapidly, requires no adult learning, and is directly linked to rapid responses, for example blinking the eye, or shielding the face to protect against a visually detected assault, or continuous maintenance of an upright position while walking through diverse environments. These responses persist in the face of stress, nausea, and disorientation. Much of this circuitry is hard wired, rapid, automatic, subconscious, and unlearned, and appears to be under genetic control.

In contrast, current flight instruments present processed data to the pilot. For example, movement with respect to world coordinates (climbing, diving, turning) are not indicated by moving points or objects, but are presented as rates of climbing, diving or turning, often indicated by a number, or needle or cursor positions. These have no analogues in real life. Our bodily sensors are designed, in contrast, to detect movement and not rates of movement. A basic assumption has been that images of individual instruments ought to be processed in the same ways, and at the same rates as the environmental inputs and conditions they represent. Long training and concentrated attention are required for instrument flight, which is extremely fatiguing under adverse conditions. Instrument flight is a learned skill, which can rapidly degenerate under conditions of extreme stress, terror, nausea, and disorientation. Thus instrument flight image processing is through a complex learned program that is easily degraded, and under the best conditions, requires more processing time than does the analogous natural process in a natural environment. It is evident that if the visual elements of a normal environment could be abstracted and their basic elements continuously presented in the cockpit environment, instrument flight could be vastly improved, done with less fatigue, with more attention to other flight tasks, and with much less training.

The objective of this invention, therefore, is to provide the same cues used in nature to provide continuously those visual elements required for situational awareness in flight or in other forms of transportation involving disorienting motion. An essential concept of the invention is to provide moving, largely peripheral, objects, icons, or points in space that mimic the essentials of natural experience, which essentials are acquired without conscious attention, with minimal learning, and would be always present in a flight environment. An additional objective is to provide a simple and ultimately inexpensive flight orientation system for small aircraft and gliders flown by non-professional pilots.

Orientation relative to the outside world, balance, rate and direction of movement are synthesized from efferent visual and vestibular signals, which in some cases can be in conflict. For example, when a pilot in a so called "graveyard spiral" breaks out of a cloud into clear air and sees the ground, visual cues quickly override misleading vestibular inputs, and world coordinates are established by basic neural circuits of the brain. Conscious thought and special training are not required for this reorientation.

The need to fly in low or no visibility situations led to the development of a basic set of instruments (i.e., turn and bank indicator, altimeter, compass and airspeed indicator). Level flight is achievable by using the rudder to set the needle of the turn and bank (or needle-ball) indicator to center, using the ailerons to set the ball in the center, and then adjusting the elevators in response to both the altimeter (altitude increasing or decreasing) and airspeed (increased in a descent, decreased in a climb). Precise flight in one direction is obtainable by reference to the compass, which also provides additional rate of turn information. Generating spatial orientation by observing a set of instruments requires long training, much of it in actual flight.

These instruments fail to provide many of the direct basic visual cues which are the dominant source of orientation information for humans. This paucity of spatially orienting cues combined with vestibular and other signals that are often in conflict with each other and with reality are contributing causes for disorientation in instrument flight. In particular, fluid in the semicircular canals only responds to rotational acceleration, and the vestibular sacs only respond to linear acceleration. Therefore the middle ear cannot respond to constant velocity motion. Hence a constant rate of rotation around any axis is not sensed, and, without other inputs, the subjective sensation is that of flight in a straight line. If an aircraft is banked during a turn so that centrifugal force is balanced by gravitational force, the subjective sensation is that the plane is in not only straight flight but level flight. Thus, pilots are taught to disregard the "seat of the pants" or vestibular and proprioceptive inputs, and to "fly the instrument panel" by synthesizing a mental image of attitude based on the instruments. Such synthesis is increasingly difficult to do in the presence of fatigue, injury, illness (including airsickness) or fear.

The gyro-horizon partially overcomes fundamental perception problems. The gyro-horizon provides a very small fixed (relative to the instrument panel) representation of the aircraft and an artificial horizon that moves behind the representation in response to a mechanical or electronic gyro, maintaining an orientation parallel to the actual horizon. The gyro-horizon presents the relative positions of the plane and the earth in pictorial form to provide a visual cue that can, with lengthy training, override vestibular inputs. The extensive training required demonstrates the gyro-horizon's failure to completely solve the basic problems. Additionally, studies of instrument flight demonstrate that the best pilots scan and inter-compare all instruments related to instrument flight, while the less efficient or less experienced pilots tend to fix on the gyro horizon.

"Heads up displays" ("HUDs") have been developed to provide positional information which appears directly in front of the pilot. The images include optically collimated virtual images of instrument data arranged so that the eyes focus at optical infinity. In theory, this should provide a horizon that not only superimposes on the real horizon when it is visible, but is arranged so that the two superimpose when the latter is not visible. Many accidents are attributed to these displays. The problem appears to be a tendency of the pilot to fixate on a very small area rather than focusing at infinity, thus being visually distracted by objects around the display.

Instances in which pilots fail to react rapidly to ground approach or other audible warnings are well known. Typically, the pilot's first reaction is to mentally question whether the warning is correct. Visual cues, such as seeing the ground rapidly approach, elicit an instant reaction.

Recent studies demonstrate that one of the strongest cross modal information exchanges is between the processing of vestibular and visual information, with visual information quickly overriding vestibular signals. For example, when a pilot breaks out of a cloud cover at night, remarkably few visual signals provide complete orientation. These may consist of a few lights on the ground, which need not be on the horizon. The reorientation does not require any set of eye movements or fixations, and the pilot may not consciously focus on anything. A world gestalt is subconsciously acquired. Unfortunately, vestibular inputs can have lasting effects, especially if they occur over a prolonged period before the canceling visual cues. Resulting dizziness and nausea can persist long after visually-induced reorientation occurs. Thus, it is important that disorientation be prevented or minimized. Experimental literature suggests that peripheral visual cues are extremely important in overcoming vestibular and proprioceptive perception. Studies also suggest that some of the strongest visual cues are those involving the movement of images across the retina. Much of this information is processed directly in the retina of the eye, and is transmitted to the brain as a set of signals separate and distinct from those transmitting images. Thus the brain is equipped to respond to the movement of objects in a field-of-view much better than to dial-based indications of rate.

One of the problems with the gyro-horizon is the size of the display, and its presentation. The angle subtended by the display is only approximately 10°, and no controlling positional visual cues approximating those in nature are presented. A second problem is that one must look consistently at the instrument rather than employing peripheral vision. A third problem is that a pilot is not automatically trained in instrument flight during routine flight, i.e., the instrument output is not continuously a normal part of his perception of world coordinates and is therefore not self teaching. A fourth problem is that the instrument panel itself does not change in attention attracting ways that are proportional to the extent of departure from normal straight and level flight. Given the large number of aircraft accidents attributed to pilot disorientation, and the large percentage of these which are related to instrument use, there is a need to develop an instrument display system which will give "clear day" visual inputs under instrument flight conditions, i.e., inputs which are native to, and are automatically and correctly interpreted even by the untrained human cortex, and thus are understood intuitively, requiring a minimum of instruction.

BRIEF SUMMARY OF THE INVENTION

This invention generally relates to providing visual cues that simulate real world visual cues in an attention attracting manner, such as through the use of movement and peripheral vision, to rapidly and effectively override vestibular signals relating to position, rate of turn, rate of descent and balance.

In one aspect, a flight information visualization system for use in an aircraft includes a first set of visual indicators extending generally vertically with respect to an interior of the aircraft, the first set of visual indicators including a first static reference indicator, at least a number of the visual indicators on either side of the first static reference indicator being selectively actuable to produce a visual indication; a second set of visual indicators extending generally vertically with respect to the interior of the aircraft and laterally spaced across a pilot's field-of-view from the first set of visual indicators, the second set of visual indicators including a second static reference indicator, at least a number of the visual indicators on either side of the second static reference indicator being selectively actuable to produce a visual indication; and at least one processor coupled to selectively activate at least some of the visual indicators of the first and the second set of visual indicators, the processor activating one of the visual indicators in the first set of visual indicators spaced from the first static indicator in a direction and by a distance proportional to a distance between an actual horizon on a first side of the aircraft during a current set of flight conditions and a reference horizon on the first side of the aircraft for a nominal set of straight and level flight conditions as a most distal activated one of the visual indicators in the first set of visual indicators from the first static indicator and activating one of the visual indicators in the second set of visual indicators spaced from the second static indicator in a direction and by a distance proportional to a distance between the actual horizon on a second side of the aircraft during the current set of flight conditions and the reference horizon on the second side of the aircraft for the nominal set of straight and level flight conditions as a most distal activated one of the visual indicators in the second set of visual indicators from the second static indicator.

In another aspect, a peripheral visualization system for displaying flight information in an aircraft includes a first set of visual indicators extending along one approximately vertical side of a windshield of the aircraft including a first level flight visual indicator; a second set of visual indicators extending along another approximately vertical side of the windshield of the aircraft, including a second level flight visual indicator, the first and the second static visual indicators in approximate registration with a reference horizon in a field-of-view from the aircraft, the visual indicators of the first and the second sets of visual indicators selectively activated such than an imaginary line extending between an outermost activated one of the indicators from each of the first and the second sets of visual indicators is in approximate registration with an actual horizon in a defined field-of-view through the windshield of the aircraft; and a third set of visual indicators extending along one approximately horizontal side of the windshield of the aircraft, including a centerline visual indicator, the visual indicators of the third set of visual indicators selectively activated such that a distance between an outermost activated one of the third set of visual indicators on either side of a centerline is proportionate to a rate of turn of the aircraft.

In another aspect, a peripheral visualization system for displaying flight information in an aircraft includes means for providing a first static visual indication within a predefined field-of-view from the interior of the aircraft; means for providing a second static visual indication within the predefined field-of-view from the interior of the aircraft, the second static visual indication spaced horizontally across the field-of-view from the first static visual indication; means for providing a most distal first dynamic visual indication spaced vertically from the first static visual indication by a distance proportionate to a distance between an actual horizon on a first side of the field-of-view from the interior of the aircraft during a current set of flight conditions and a reference horizon on the first side of the field-of-view from the interior of the aircraft for a nominal set of straight and level flight conditions; and means for providing a most distal second dynamic visual indication spaced vertically from the second static visual indication by a distance proportionate to a distance between an actual horizon on a second side of the field-of-view from the interior of the aircraft during a current set of flight conditions and a reference horizon on the second side of the field-of-view from the interior of the aircraft for a nominal set of straight and level flight conditions.

In still another aspect, a method of providing visual flight information in an aircraft having an interior includes providing a first static visual indication within a predefined field-of-view from the interior of the aircraft; providing a second static visual indication within the predefined field-of-view from the interior of the aircraft, the second static visual indication spaced horizontally across the field-of-view from the first static visual indication; providing a most distal first dynamic visual indication spaced vertically from the first static visual indication by a distance proportionate to a distance between an actual horizon on a first side of the field-of-view from the interior of the aircraft during a current set of flight conditions and a reference horizon on the first side of the field-of-view from the interior of the aircraft for a nominal set of straight and level flight conditions; and providing a most distal second dynamic visual indication spaced vertically from the second static visual indication by a distance proportionate to a distance between an actual horizon on a second side of the field-of-view from the interior of the aircraft during a current set of flight conditions and a reference horizon on the second side of the field-of-view from the interior of the aircraft for a nominal set of straight and level flight conditions.

In a further aspect, a computer readable media stores instructions for causing a computer to display flight information on a number of indicators in an aircraft, by: providing a first static visual indication within a predefined field-of-view from the interior of the aircraft; providing a second static visual indication within the predefined field-of-view from the interior of the aircraft, the second static visual indication spaced horizontally across the field-of-view from the first static visual indication; providing a most distal first dynamic visual indication spaced vertically from the first static visual indication by a distance proportionate to a distance between an actual horizon on a first side of the field-of-view from the interior of the aircraft during a current set of flight conditions and a reference horizon on the first side of the field-of-view from the interior of the aircraft for a nominal set of straight and level flight conditions; and providing a most distal second dynamic visual indication spaced vertically from the second static visual indication by a distance proportionate to a distance between an actual horizon on a second side of the field-of-view from the interior of the aircraft during a current set of flight conditions and a reference horizon on the second side of the field-of-view from the interior of the aircraft for a nominal set of straight and level flight conditions.

In yet a further aspect, a method of providing visual flight information in an aircraft having an interior includes providing a first set of visual indications extending generally vertically with respect to an interior of the aircraft, the first set of visual indications including a first static reference indication and a most distal indication spaced from the first static indication in a direction and by a distance proportional to a distance between an actual horizon on a first side of the aircraft during a current set of flight conditions and a reference horizon on the first side of the aircraft for a nominal set of straight and level flight conditions; a second set of visual indications extending generally vertically with respect to the interior of the aircraft and laterally spaced across a pilot's field-of-view from the first set of visual indications, the second set of visual indications including a second static reference indication and a most distal indication spaced from the second static indication in a direction and by a distance proportional to a distance between the actual horizon on a second side of the aircraft during the current set of flight conditions and the reference horizon on the second side of the aircraft for the set of straight and level flight conditions; and providing a third set of visual indications extending generally horizontally with respect to the interior of the aircraft, the third set of visual indications including a third static reference indication and a most distal third visual indication on either side of the third static indication, spaced from the third static indication by a distance proportional to a rate of turn of the aircraft.

In still a further aspect, a computer readable media stores instructions for causing a computer to display flight information on a number of indicators in an aircraft, by: providing a first set of visual indications extending generally vertically with respect to an interior of the aircraft, the first set of visual indications including a first static reference indication and a most distal indication spaced from the first static indication in a direction and by a distance proportional to a distance between an actual horizon on a first side of the aircraft during a current set of flight conditions and a reference horizon on the first side of the aircraft for a nominal set of straight and level flight conditions; a second set of visual indications extending generally vertically with respect to the interior of the aircraft and laterally spaced across a pilot's field-of-view from the first set of visual indications, the second set of visual indications including a second static reference indication and a most distal indication spaced from the second static indication in a direction and by a distance proportional to a distance between the actual horizon on a second side of the aircraft during the current set of flight conditions and the reference horizon on the second side of the aircraft for the set of straight and level flight conditions; and providing a third set of visual indications extending generally horizontally with respect to the interior of the aircraft, the third set of visual indications including a third static reference indication and a most distal third visual indication on either side of the third static indication, spaced from the third static indication by a distance proportional to a rate of turn of the aircraft.

The display system described may be used in other applications such as in ships at sea, naval landing craft, and in enclosed military vehicles driving over rough terrain to both help prevent seasickness and to assist in navigation.

The systems described may be incorporated into a computer program to display a programmable external environment, the interior of an aircraft of vessel as seen by a pilot or observer, flight or other instruments, and the display of the present invention, which program is controllable by an operator or subject in such a manner as to mimic flight or other conditions. The program may be written in such a manner as to present a series of conditions requiring measurable operator input. The system and program may be further designed to measure and record the time intervals required, to make those responses, and to objectively evaluate the appropriateness of the responses. This flight simulator will allow experimental studies to be done in which the subject passes, in simulation, through VFR and IFR conditions, and detects and responds to programmed attitudinal changes with only the standard instrument display visible, with only the display of the present invention visible, with both visible, and with neither visible. Using subjects with no flight training, subjects with only VFR training, and subjects with extensive instrument flight training, the ease with which situational awareness may be acquired, and the speed and appropriateness of responses may be measured.

In an additional aspect, a flight information display system for providing flight information in an aircraft includes a display; a static horizon reference indicator; and a processor coupled to the display and configured to produce an image on the display including a number of substantially parallel pitch lines, at least a first one of the pitch lines having a first visual characteristic and at least a second one of the pitch lines displayed at a same time as the first pitch line having a second visual characteristic, different from the first visual characteristic, a distance between the horizon reference indicator and an interface between the first and the second pitch lines being proportional to a pitch of the aircraft under current flight conditions, where the pitch lines scroll perpendicularly across the display at a rate proportional to a rate of altitude change of the aircraft, if any.

In still another additional aspect, a method of providing a display of flight information for an aircraft on a display includes receiving a set of flight information for the aircraft; determining a number of successive images based on the received flight information, the images including a number of substantially parallel pitch lines, at least a first one of the pitch lines having a first visual characteristic and at least a second one of the pitch lines having a second visual characteristic in the same image, different from the first visual characteristic, a distance between a horizon reference indicator and an interface between the first and the second pitch lines being proportional to a pitch of the aircraft under current flight conditions; and displaying the determined images.

In still a further additional aspect, a computer readable media stores instructions for causing a computer to display flight information on a number of indicators in an aircraft, by: displaying a number of substantially parallel pitch lines, at least a first one of the pitch lines having a first visual characteristic and at least a second one of the pitch lines displayed at a same time as the first pitch line having a second visual characteristic, different from the first visual characteristic, a distance between a horizon reference indicator and an interface between the first and the second pitch lines being proportional to a pitch of the aircraft under current flight conditions, where the pitch lines scroll perpendicularly across the display at a rate proportional to a rate of altitude change of the aircraft, if any; and displaying a number of substantially parallel yaw lines, the yaw lines substantially perpendicular to the pitch lines, where the yaw lines scroll perpendicularly across the display with respect to a static heading reference indicator at a rate proportional to a rate of turn of the aircraft, if any.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been selected solely for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with aircraft, aircraft instrumentation, display producing devices, microprocessors and other microcontrollers have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Figure 1:
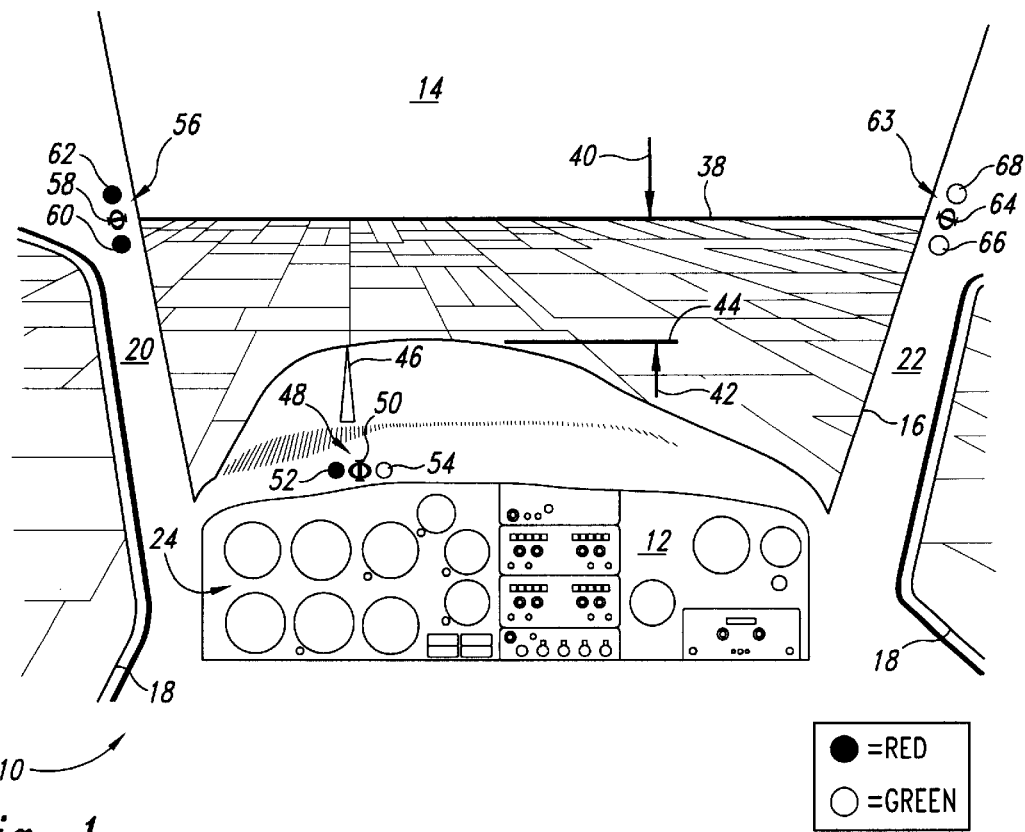
FIG. 1 is a schematic view of an interior of a cockpit of an aircraft in straight and level flight showing a windshield, a set of flight instruments and a number of visual indications according to an embodiment of the invention.

FIG. 1 illustrates a pilot's field-of-view from a cockpit 10 of an aircraft, showing an interior 12 of the cockpit 10 and an exterior 14 visible through a windshield 16 and side windows 18 of the cockpit 10. A typical main field-of-view for humans is approximately plus and minus 30 degrees vertically and plus and minus 80 degrees horizontally. The windshield 16 is positioned between a port or left pillar 20 and a starboard or right pillar 22 of the cockpit 10, that extend generally vertically with respect to the interior of the cockpit 10. (Unless otherwise noted, all directions are given with respect to the pilot's field-of-view, looking generally toward the windshield 16.) The cockpit 10 includes an instrument panel 24, generally positioned under the windshield 16.

Figure 2:
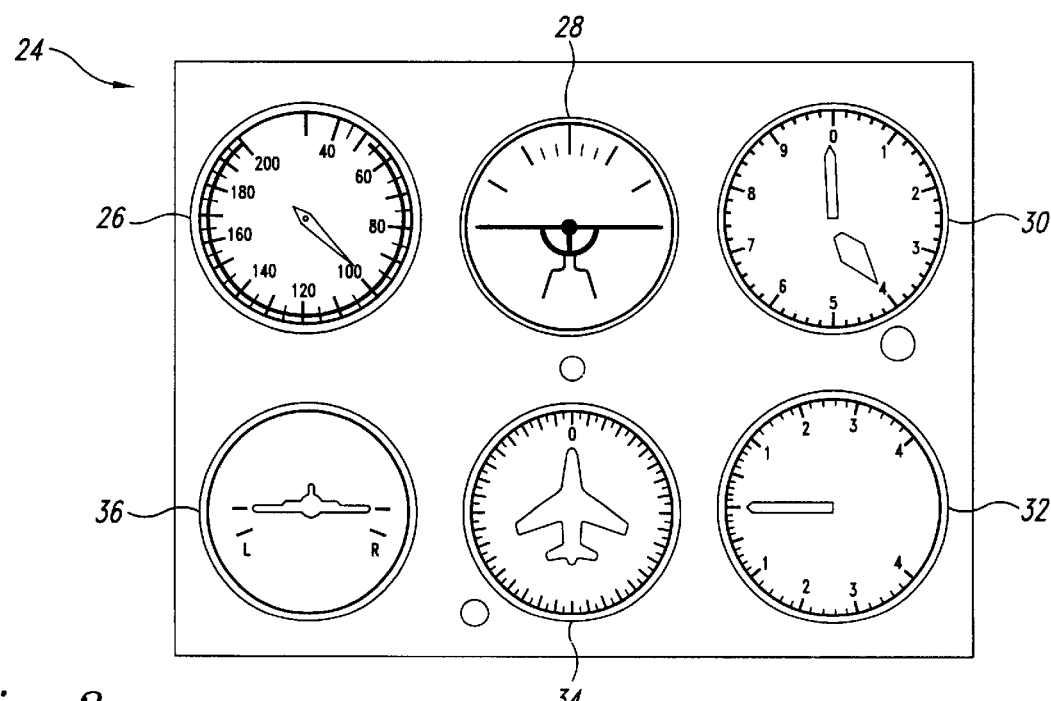
FIG. 2 is an enlarged schematic view of the flight instruments of FIG. 1.

FIG. 2 is an enlarged view of the instrument panel 24 under the flight conditions of FIG. 1. The flight instruments include an airspeed indicator 26, a gyro-horizon or attitude indicator 28, an altimeter 30, a vertical speed indicator 32, a compass or heading indicator 34, and a turn and bank coordinator 36. As illustrated in FIG. 2, the flight instruments indicate straight and level flight for the aircraft, the airspeed indicator 26 indicating normal airspeed, the attitude indicator 28 indicating nose- and wings in level flight, the altimeter 30 indicating a stable altitude, the vertical speed indicator 32 indicating no change in altitude, the heading indicator 34 indicating a constant heading, and the turn and bank coordinator 36 indicating balanced flight.

With continuing reference to FIG. 1, the view through the windshield 16 confirms the straight and level flight conditions, which shows a horizon 38 appearing to the pilot at a fixed forward angle indicated by arrows 40, 42 with respect to an engine cowling or nose of the aircraft indicated by a line 44. From the pilot's perspective, the angle between the horizon 38 and the nose 44 does not change during level flight.

A line 46 illustrates the pilot's line of sight forward, toward the windshield 16 and a flight instrument panel 24. A yaw (i.e., heading) display 48 includes a static yaw reference visual indication ("Φ" or other appropriate symbol) 50 that is centered on the forward line of sight 46. As suggested by use of the term static, the static yaw reference visual indication 50 is fixed, providing a reference mark for the pilot. The yaw display 48 also includes a number of dynamic yaw visual indications 52 (only one shown in FIG. 1) selectively producible to the left of the yaw reference visual indication 50, and a number of dynamic yaw visual indications 54 (only one shown in FIG. 1) selectively producible to the right of the yaw reference visual indication 50. As suggested by use of the term dynamic, the dynamic yaw visual indications 52, 54 are selectively produced and positioned based on the current flight conditions of the aircraft. The dynamic yaw visual indications 52, 54 may have a different appearance from the static yaw reference visual indication 50, for example employing different shapes, symbols and/or colors to clearly distinguish the indications 50, 52, 54. As explained in detail below, the static and dynamic yaw visual indications 50, 52, 54 can be produced in a variety of different ways, and can take any of a variety of forms capable of serving as a visual indication within a field-of-view of the pilot.

In operation, when the aircraft is on a steady course a single red yaw visual indication 52 is provided on the left side of the yaw reference visual indication 50 and a single green yaw visual indication 54 is provided on the right side of the yaw reference visual indication 50 (as illustrated in FIG. 1). Red is conventionally associated with the port side of a vessel, such as an aircraft, while green is conventionally associated with the starboard side of the vessel. A very small deviation to the right causes the red yaw visual indication 52 to cease, while the green yaw visual indication 54 continues to be provided. Similarly a small deviation to the left causes the green yaw visual indication 54 to cease, while the red yaw visual indication 52 is still provided. This provides the pilot with visual indications of small deviations in yaw or heading, which the pilot can quickly correct. Additionally, the yaw reference visual indication 50 can be hi-lighted or otherwise emphasized (e.g., flashing, color change, etc.) when the aircraft is on a steady course. Alternatively, the appearance of the yaw reference visual indicator 50 may be unrelated to the course of the aircraft, remaining unchanged during flight. In a related alternative, the yaw reference visual indicator 50 can even take the form of a permanently visible marking, such as a decal, paint, or other permanent indicia.

The yaw display 48 may be controlled by a compass or a global positioning system to continuously update the heading and compensate for drift. This means that the yaw reference visual indicator 50 would be moveable.

Extending along a left side of the windshield 16, for example, on the left pillar 20, is a left side attitude (i.e., pitch and roll) display 56 including a static left side horizon reference visual indication 58 ("θ" or other appropriate symbol). The left side attitude display 56 can include one or more dynamic attitude visual indications 60 (only one shown in FIG. 1) produced relatively below the left side horizon reference visual indication 58, and/or one or more dynamic attitude visual indications 62 (only one shown in FIG. 1) produced relatively above the left side horizon reference visual indication 58.

Extending along a right side of the windshield 16, for example, attached to the right pillar 22 is a right side attitude (i.e., pitch and roll) display 63 including a static right side horizon reference indication 64 ("θ" or other appropriate symbol). The right side attitude display 63 can include one or more dynamic attitude visual indications 66 produced relatively below the right side horizon reference visual indication 64 and/or one or more dynamic attitude visual indications 68 produced relatively above the right side horizon reference visual indication 64.

The left and right side horizon reference indications 58, 64 are positioned within the cockpit 10 such that an imaginary line extending through the left and right side horizon reference indications 58, 64 is, from the pilot's perspective, in alignment or registration with the horizon 38 when the aircraft is in straight and level flight. As suggested by use of the term static, the static left and right side horizon reference indications 58, 64 are generally fixed during flight to provide a reference for the pilot.

The dynamic attitude visual indications 60, 66 spaced below the respective horizon reference visual indication 58, 64 may be different from the dynamic attitude visual indications 62, 68 spaced above the respective horizon reference visual indication 58, 64. For example, the dynamic attitude visual indications 60, 66 below the horizon reference visual indication 58, 64 may be one color (e.g., red), while the dynamic attitude visual indications 62, 68 above the horizon reference visual indication 58, 64 may another color (e.g., green).

In operation, when the aircraft is in level flight, a single green dynamic attitude visual indication 62, 68 appears above each of the horizon reference visual indications 58, 64 and a single red dynamic attitude visual indication 60, 66 appears below each of the horizon reference visual indications 58, 64. A very small deviation from level flight in an upward direction with respect to the world coordinates causes the cessation of the dynamic attitude visual indication 62, 68 above the horizon reference visual indication 58, 64, while the dynamic attitude visual indication 60, 66 below the horizon reference visual indication 58, 64 continues to be provided. A small deviation in a downward direction causes the cessation of the dynamic attitude visual indication 60, 66 below the horizon reference visual indication 58, 64, while the dynamic attitude visual indication 62, 68 above the horizon reference visual indication 58, 64 continues to be provided.

The horizon reference visual indications 58, 64 do not move or appear to move in response to flight maneuvers. In some embodiments, the horizon reference visual indications 58, 64 can be adjusted vertically so that they appear to the pilot to be on the plane of the actual horizon 38 when in straight and level flight. Thus, during level flight none of the static or dynamic visual indications appear to move, although, as discussed in detail below, dynamic attitude visual indications 60, 62, 66, 68 on either side of horizon reference visual indications 58, 64 and dynamic yaw visual indications 52, 54 on either side of the yaw reference visual indication 50 can be selectively displayed to indicate small deviations from straight and level flight. This provides a minimal display system for straight and level flight in good weather, that is minimally obtrusive and employs a pilot's peripheral vision and movement in an attention attracting manner.

Figure 3:
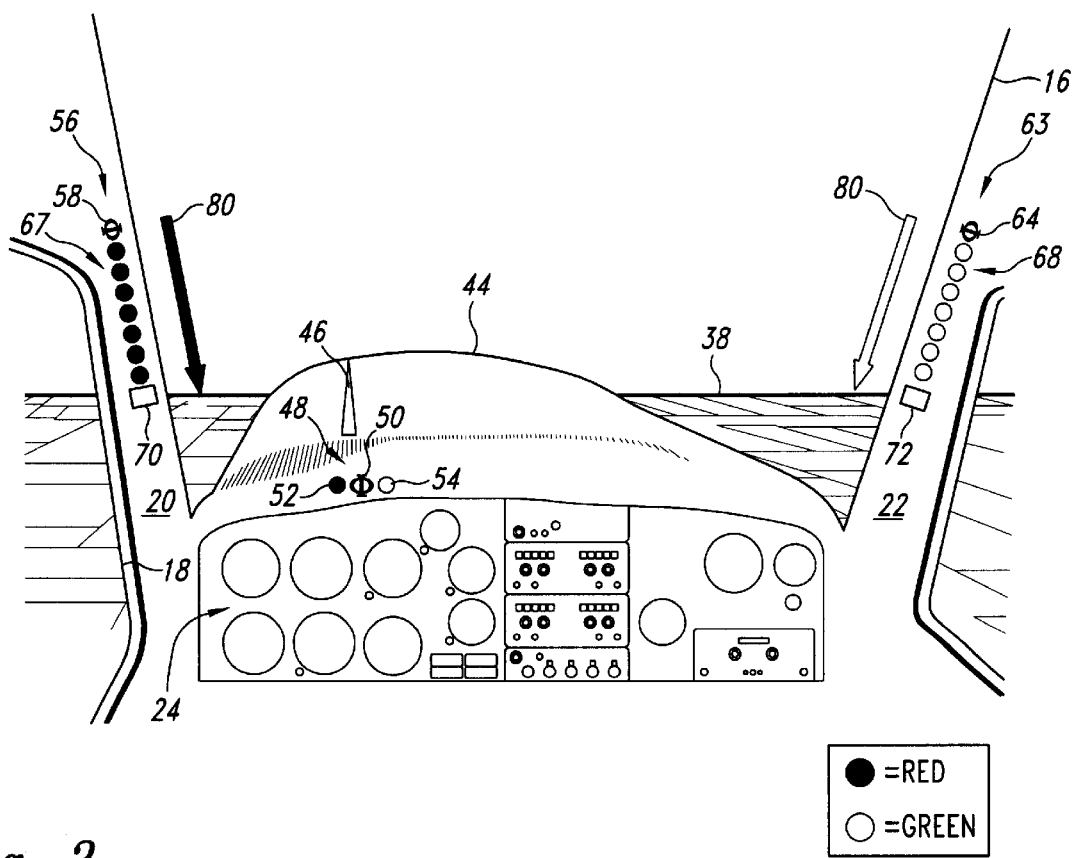
FIG. 3 is a schematic view of the interior of the cockpit of the aircraft during normal straight climb.

FIG. 3 illustrates the pilot's field-of view from the cockpit 10 of the aircraft during a straight climb at a constant rate. The view through the windshield 16 confirms the straight and climbing flight conditions, which shows that the nose 44 of the aircraft appears to the pilot to be above horizon 38.

Figure 4:
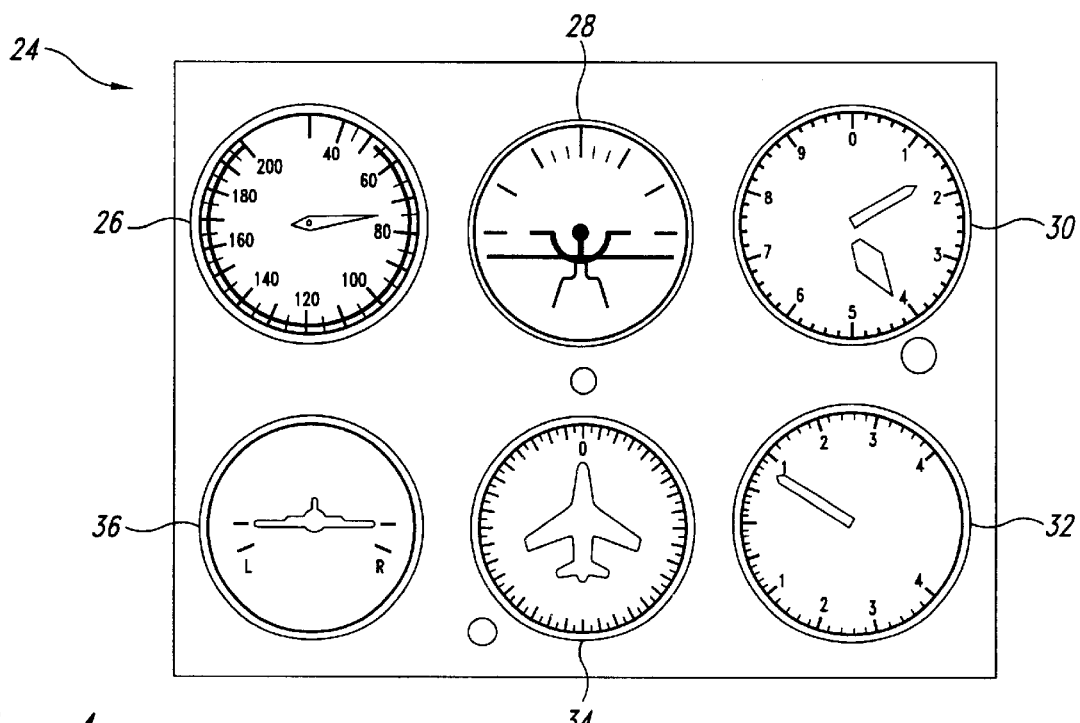
FIG. 4 is an enlarged schematic view of the flight instruments of FIG. 3.

FIG. 4 shows the instrument panel 24 under the flight conditions of FIG. 3. As illustrated in FIG. 4, the flight instruments also indicate a straight and climbing flight for the aircraft, the airspeed indicator 26 indicating a drop in airspeed, the attitude indicator 28 indicating the nose is above the horizon, the altimeter 30 indicating an increasing altitude, the vertical speed indicator 32 indicates a positive vertical speed, the heading indicator indicating a constant heading, and the turn and bank coordinator 36 indicating balanced flight.

With continuing reference to FIG. 3, the yaw display 48 is unchanged from that of FIG. 1, indicating straight flight. From the pilot's point of view, the static horizon reference visual indications 58, 64 are now spaced relatively above the horizon 38 in proportion to the positive angle of attack for the aircraft. Each of the left and right side attitude displays 56, 63 include a respective outermost dynamic attitude visual indication 70, 72 (shown as squares), respectively. The outermost attitude visual indications 70, 72 are superimposed on the horizon 38. Since the horizon reference visual indications 58, 64 remain fixed relative to the cockpit of the aircraft, the horizon reference visual indications 58, 64 continue to indicate where the horizon 38 would be in level flight. In contrast, the outermost attitude visual indicators 70, 72 move up and down as the nose of the aircraft moves up or down, to indicate the actual position of the horizon 38 under the current flight conditions. Where the aircraft is not banked, the distance between the horizon reference visual indication 58, 64 and the respective outermost attitude visual indication 70, 72 is proportional, and thus indicates, the angle of attack of the aircraft. Thus, the positions of the outermost attitude indications 70, 72 relative to the horizon reference visual indications 58, 64 provides intuitive visual attitude feedback to the pilot in low or no visibility conditions, such as when the horizon 38 is not visible.

Additional dynamic attitude visual indications 67, 68 appear between the horizon reference visual indications 58, 64 and the respective outermost attitude visual indications 70, 72. The additional dynamic attitude visual indications 67, 68 are sequentially produced or displayed to create the appearance of constantly indexing (i.e., marquee) in a generally downward direction (illustrated by arrows 80) to give the pilot the visual impression of climbing. Where the visual indications 67, 68 are of approximately uniform size and/or spacing, the number of additional dynamic visual indications 67, 68 between the horizon reference visual indications 58, 64 and the respective outermost visual indications 70, 72 is also proportionate to angle of attack of the aircraft where the aircraft is not banked. The rate of indexing can be proportional to the rate of altitude change (descent/climb), providing further intuitive feed back to the pilot.

Figure 5:
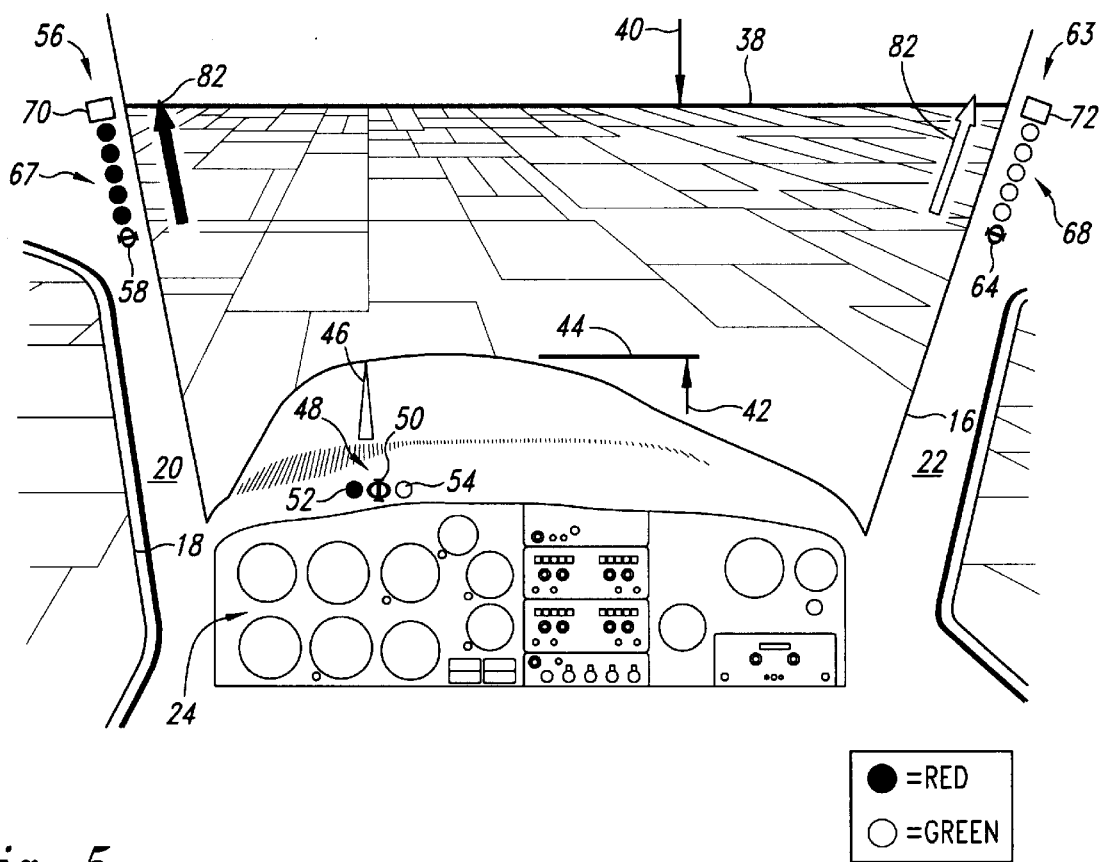
FIG. 5 is a schematic view of the interior of the cockpit of the aircraft during normal power-off glide or straight descent.

FIG. 5 illustrates the pilot's field-of-view from the cockpit 10 during a normal power-off glide. The view through the windshield 16 confirms the power-off glide flight conditions, which shows the nose 44 of the aircraft appears to the pilot to be below the horizon 38.

Figure 6:
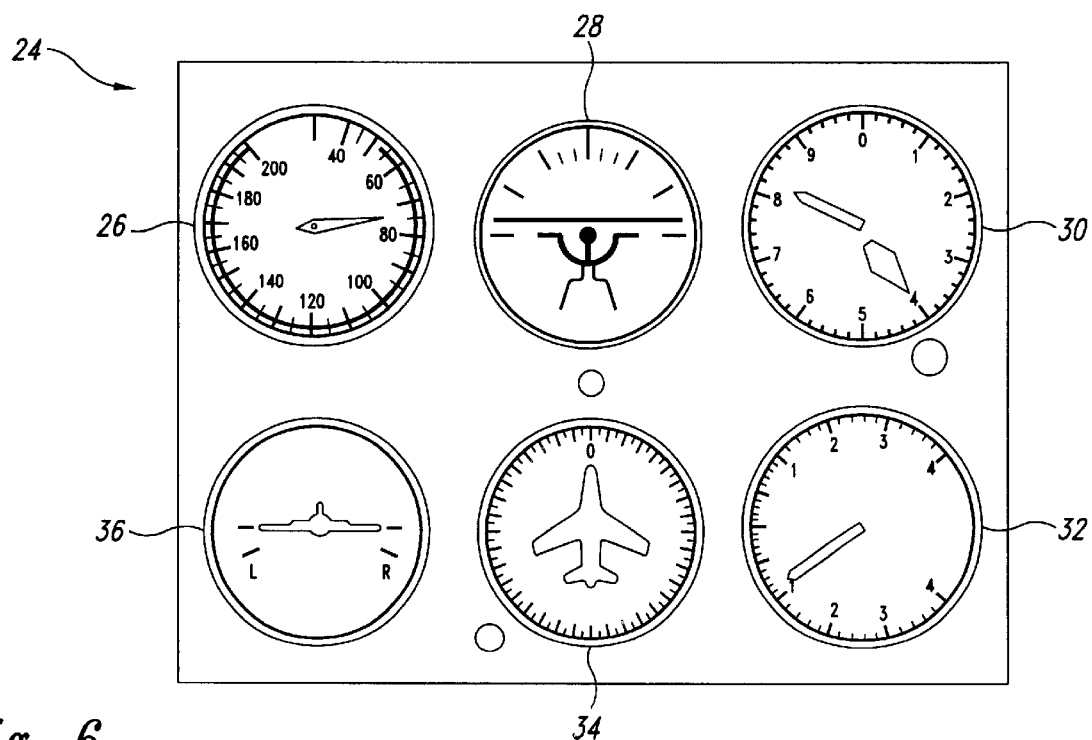
FIG. 6 is an enlarged schematic view of the flight instruments of FIG. 5.

FIG. 6 shows the instrument panel 24 of FIG. 5 under the flight conditions of FIG. 5. As illustrated in FIG. 6, the flight instruments also indicate a straight power off descent, the airspeed indicator 26 is steady at the normal glide speed, the attitude indicator 28 indicating a slight nose-low, wings-level attitude, the altimeter 30 and vertical speed indicator 32 indicating a loss of altitude, the heading indicator 34 indicating a constant heading and the turn and bank indicator 36 indicating balanced flight.

With continuing reference to FIG. 5, the yaw display 48 is unchanged from that of FIGS. 1 and 3, indicating straight flight. From the pilot's point of view, the static horizon reference visual indications 58, 64 are now spaced relatively below the horizon 38 in proportion to the negative angle of attack for the aircraft. The outermost attitude visual indications 70, 72, which indicate the actual position of the horizon 38, are spaced above the respective horizon reference visual indications 58, 64 by a distance proportional to the angle of attack of the aircraft indicated by opposed arrows 40, 42. In between the horizon reference visual indications 58, 64 and the respective outermost attitude visual indications 70, 72 are additional dynamic attitude visual indications 67, 68. The additional attitude visual indications 67, 68 are sequentially produced or displayed to create the appearance of constantly indexing in a generally upward direction (illustrated by arrows 82) to give the pilot the visual impression of descending. Again the rate of indexing is proportionate to the rate of altitude change.

In the special case where level attitude is maintained at a speed less than that required to maintain altitude (i.e., plane sinks), and the attitude indicator 28 indicates level flight, visual numeric representations of the sink rate can be produced above and/or below the horizon reference visual indications 58, 64, and The additional attitude visual indications 67, 68 are sequentially produced or displayed to create the appearance of constantly indexing in a generally upward direction to give the pilot the visual impression of descending.

Figure 7:
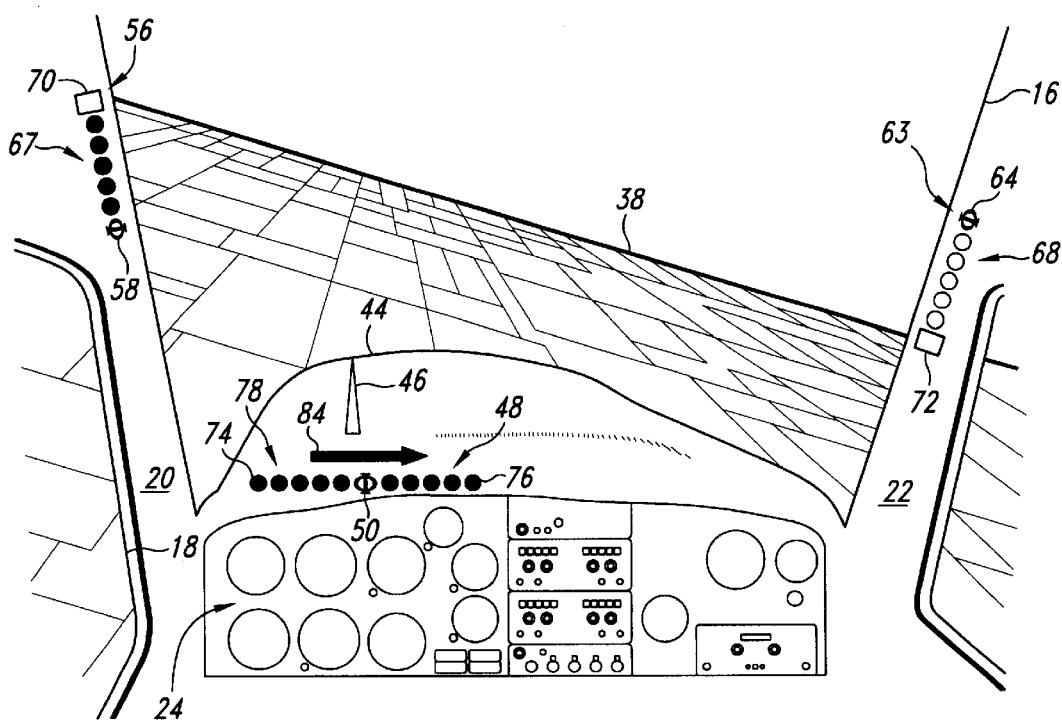
FIG. 7 is a schematic view of the cockpit of the aircraft during balanced constant-altitude standard rate turn.

FIG. 7 illustrates the pilot's field-of-view from the cockpit 10 of the aircraft during a balanced standard-rate constant altitude turn. The view through the windshield 16 confirms the balanced standard-rate constant altitude turn flight conditions, which shows the horizon 38 sloping downwardly from left to right with respect to the nose 44 of the aircraft.

Figure 8:
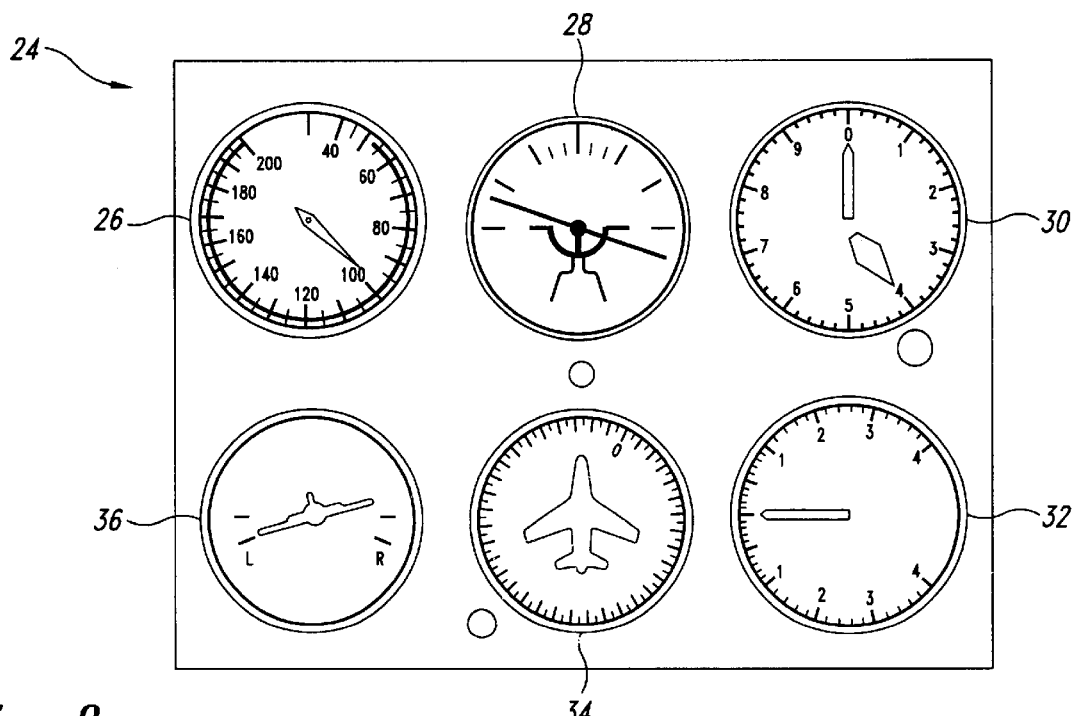
FIG. 8 is an enlarged schematic view of the flight instruments of FIG. 7.

FIG. 8 shows the instrument panel 24 under the flight conditions of FIG. 7. As illustrated in FIG. 8, the flight instruments indicate a balanced standard-rate constant altitude turn, the airspeed indicator 26 is slightly less than cruising speed because of bank (and back pressure), the attitude indicator 28 indicating a nose level left turn, the altimeter 30 indicating that the altitude is constant, vertical speed indicator 32 indicating a vertical speed of zero, the heading indicator 34 moving to indicate a left turn, and the turn and bank coordinator 36 indicating a balanced standard-rate turn to the left.

With continuing reference to FIG. 7, a dynamic outermost yaw visual indication 74, 76 appears on either side of the static yaw reference visual indication 50, spaced from the yaw reference visual indication 50 by a distance proportional to a rate of turn for the aircraft. A number of additional dynamic yaw visual indications 78 can appear between the outermost yaw visual indications 74, 76. The additional yaw visual indications 78 are sequentially produced or displayed to create the appearance of constantly indexing generally to the right (as illustrated by arrow 84 pointing right) to give the pilot the visual impression of turning to the left.

A pilot can easily determine a standard rate turn from, for example, the number of distinct indications (e.g., three, five) produced on either side of the yaw reference visual indication 50. Additionally or alternatively, the yaw display 48 can include reference indications to assist the pilot in judging the distance between the outermost yaw visual indications 74, 76 and the yaw reference visual indication 14. For example, a reference indication such as an arrow (not shown) can delineate a 2 minute turn. Thus, a pilot can easily determine a standard rate turn from the position of the outermost yaw visual indication 74, 76 with respect to the reference indication.

The dynamic left outermost attitude visual indication 70 is aligned on the horizon 38, spaced relatively above the respective static horizon reference visual indication 58 by a first distance. The dynamic right outermost attitude visual indication 72 is aligned on the horizon 38, spaced relatively below the respective static horizon reference visual indication 64 by a second distance. The pilot can visually determine that the plane is banking since the left and right outermost attitude visual indications 70, 72 are inverted with respect to the horizon reference visual indications 58, 64. The pilot can also visually determine that the aircraft is banked toward the left since the left outermost attitude visual indicator 70 is spaced above the respective horizon reference visual indicator 58, or since the right most attitude visual indicator 72 is spaced below the respective horizon reference visual indicator 64. The pilot can further visually determine the amount of bank which is proportional to the vector added sum of the first and the second distances. Since no altitude change occurs, the attitude visual indications 66, 68, 70, 72 are not indexed (i.e., do not appear to move or marquee).

Figure 9:
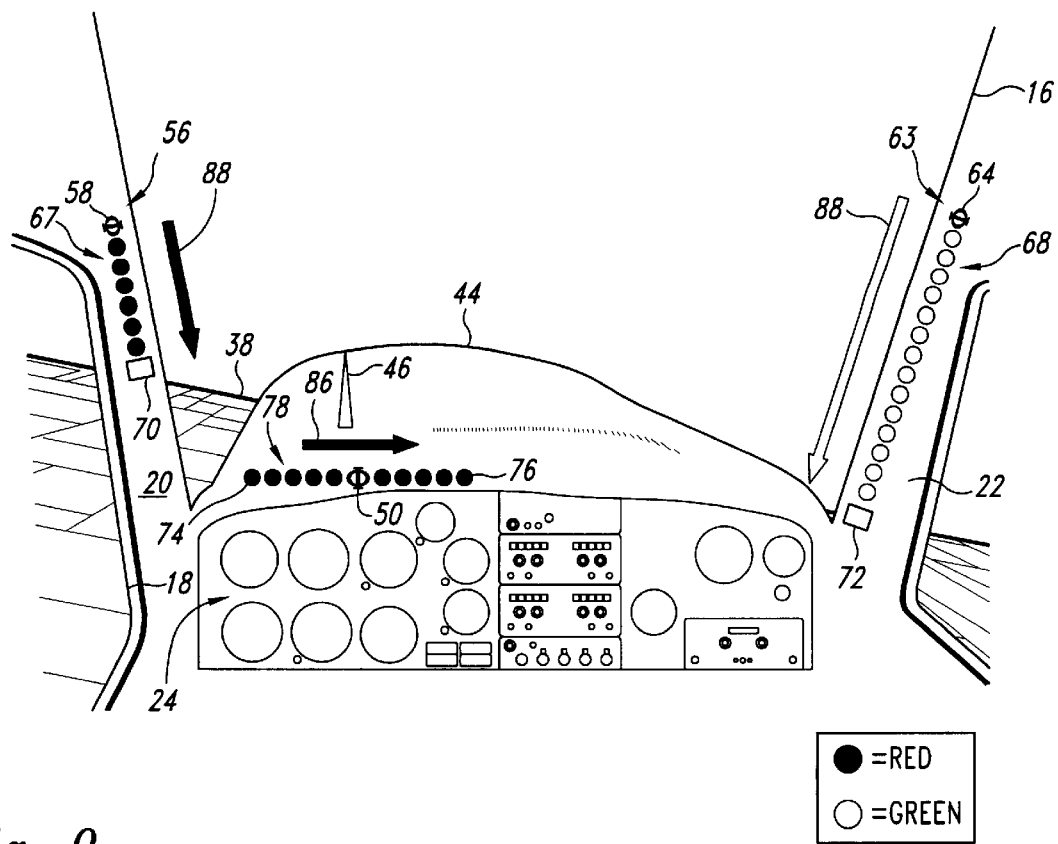
FIG. 9 is a schematic view of the interior of the cockpit of the aircraft during climbing standard rate turn.

FIG. 9 illustrates the pilot's field-of view from the cockpit 10 of the aircraft during a climbing standard-rate turn. The view through the windshield 16 confirms the climbing standard-rate turn flight conditions, which shows that the nose 44 of the aircraft appears to the pilot to be above horizon 38 and the horizon 38 appears to be sloping downwardly from left to right with respect to the nose 44 of the aircraft.

Figure 10:
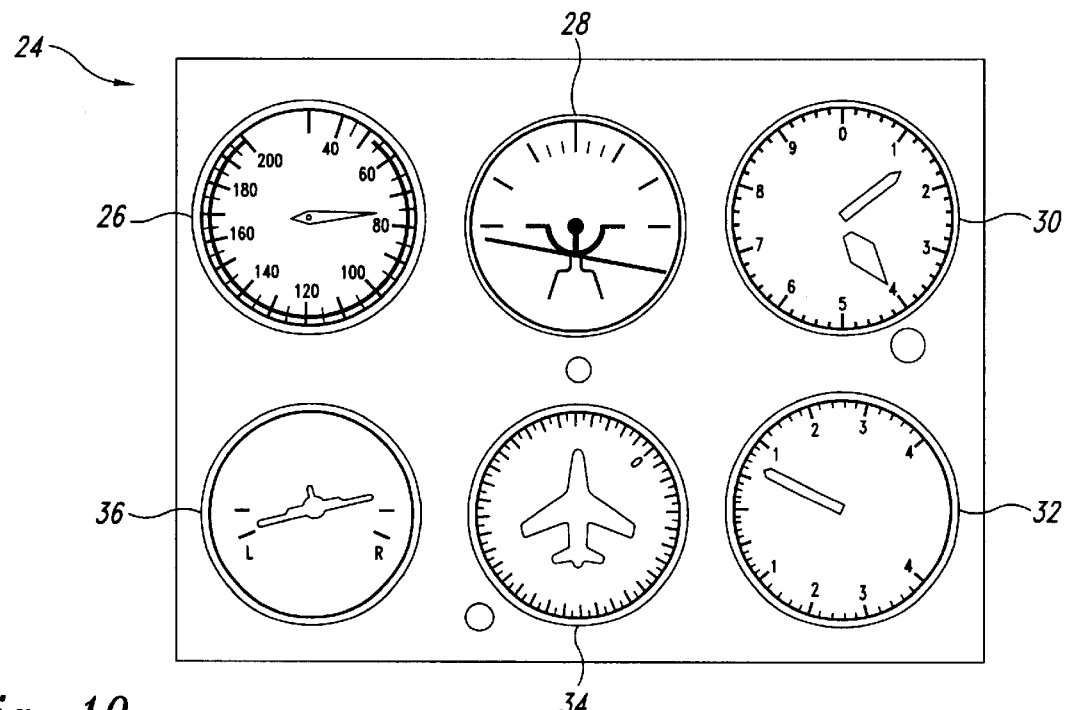
FIG. 10 is an enlarged schematic view of the flight instruments of FIG. 9.

FIG. 10 shows the instrument panel 24 under the flight conditions of FIG. 9. As illustrated in FIG. 10, the flight instruments indicate a climbing standard-rate turn, the airspeed indicator 26 indicating airspeed as steady at climb speed, the attitude indicator 28 indicating a climbing turn to the left, and the altimeter 30 and vertical airspeed indicator 32 both indicating a climb, the heading indicator 34 indicating a turn to the left, and the turn and bank coordinator 36 indicating a bank to the left.

With continuing reference to FIG. 9, a dynamic outermost yaw visual indication 74, 76 appears on each side of yaw reference visual indication 50. The distance between each of the outermost yaw visual indication 74, 76 and the yaw reference visual indication 50 is proportional to the rate of turn of the aircraft. A number of additional dynamic yaw visual indications 78 can appear between the outermost yaw visual indications 74, 76 and the yaw reference visual indication 50. The dynamic yaw visual indications 74, 76, 78 can have a first appearance (e.g., red) to indicate a left turn. The dynamic yaw visual indications 78 are sequentially produced or displayed to create the appearance of constantly indexing generally to the right (as illustrated by arrow 86 pointing right) to give the pilot the visual impression of a turn to the left.

The dynamic left outermost attitude visual indication 70 is aligned on the horizon 38, spaced relatively below the respective static horizon reference visual indication 58 by a first distance. The dynamic right outermost attitude visual indication 72 is aligned on the horizon 38, spaced relatively below the respective static horizon reference visual indication 64, by a second distance greater than the first distance. Even though the outermost attitude visual indications 70, 72 are not inverted, the pilot can visually determine that the aircraft is banking since the first and second distances are not equal. The pilot can also visually determine that the bank is toward the left since the outermost attitude visual indications 70, 72 are below the horizon reference visual indications 58, 64 and the first distance is less than the second distance. (Note: this rule works for a positive angle of attack, and is opposite that of FIG. 11). The pilot can additionally visually determine the magnitude of the bank which is proportional to the vector added sums of the first and second distances. Additional attitude visual indications are sequentially produced or displayed between the outermost attitude visual indications 70, 72 and the respective horizon reference visual indications 58, 64 to create the appearance of constantly indexing in a generally downward direction (as illustrated by arrows 88) to give the pilot the visual impression of a climb. The rate of indexing can be proportional to the rate of altitude change.

Figure 11:
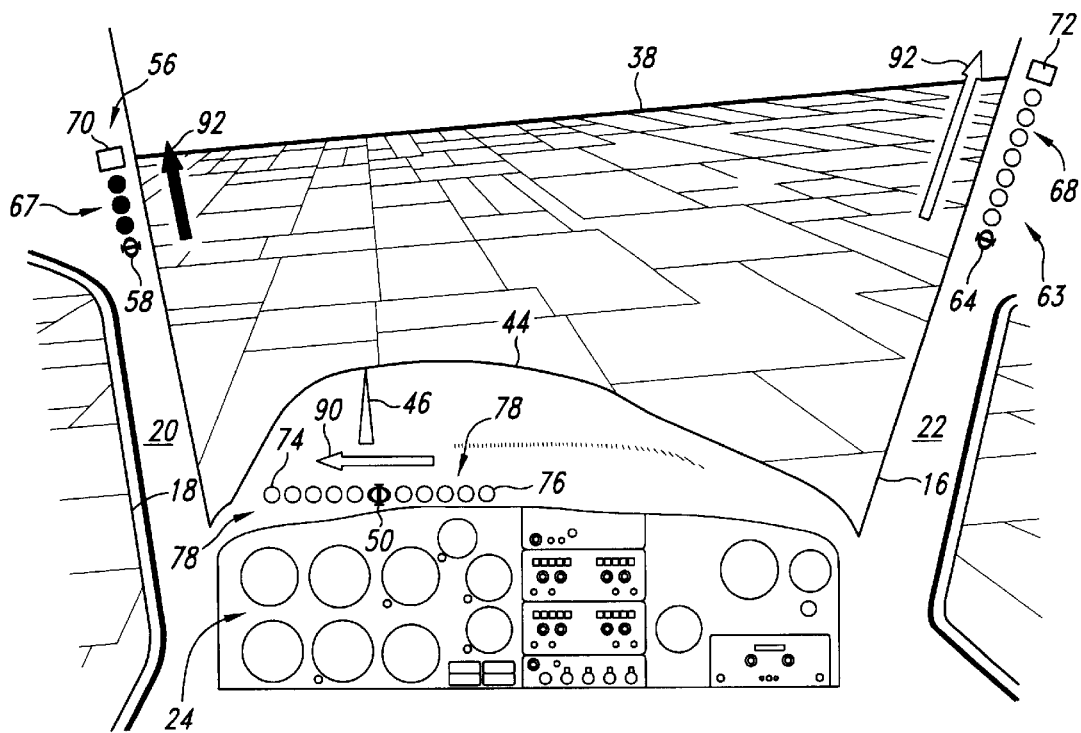
FIG. 11 is a schematic view of the interior of the cockpit of the aircraft during balanced standard-rate gliding turn to the right.

FIG. 11 illustrates the pilot's field-of view from the cockpit 10 of the aircraft during a gliding standard rate turn to the right. The view through the windshield 16 confirms the gliding standard rate turn to the right flight conditions, which shows that the nose 44 of the aircraft appears to the pilot to be below the horizon 38 and the horizon 38 appears to be sloping upwardly from left to right with respect to the nose 44 of the aircraft.

Figure 12:
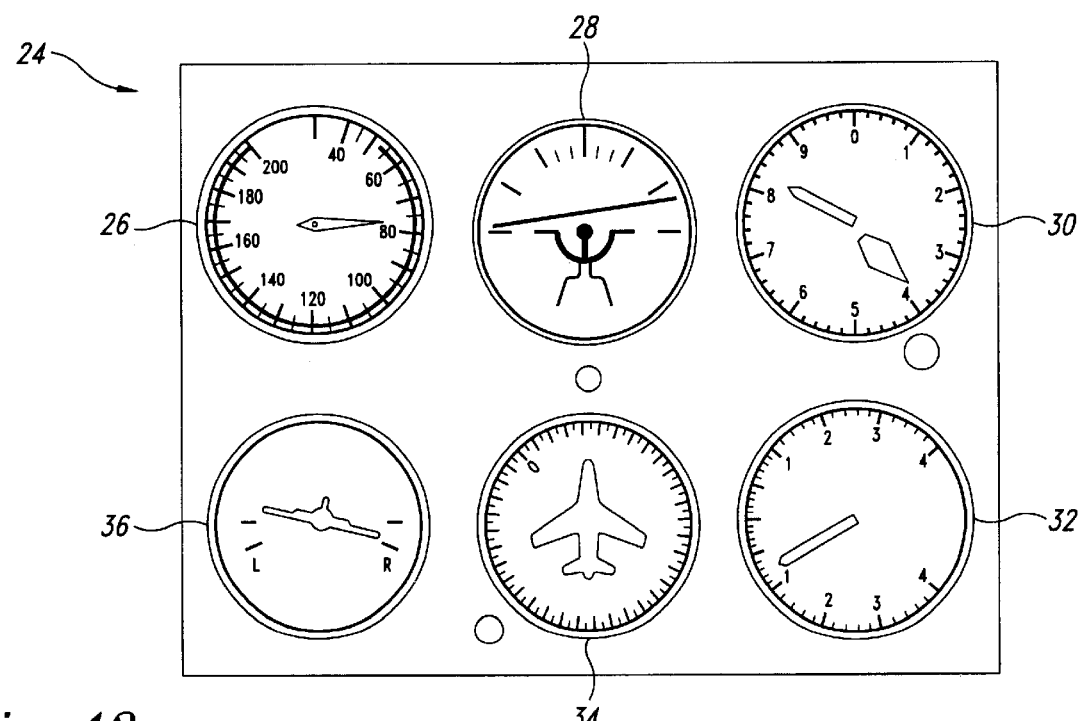
FIG. 12 is an enlarged schematic view of the flight instruments of FIG. 11.

As illustrated in FIG. 12, the flight instruments indicate a gliding standard rate turn to the right, the airspeed indicator 26 is steady at glide speed, the attitude indicator 28 shows a slight nose-low bank of 10° to the right, the altimeter 30 indicating decreasing altitude, the vertical speed indicator 32 indicating a descent, the heading indicator 34 indicating a right turn, and the turn and bank coordinator 36 indicating a balanced standard-rate right turn.

With continuing reference to FIG. 11, a dynamic outermost yaw visual indication 74, 76 appears on each side of yaw reference visual indication 50. The distance between each of the outermost yaw visual indications 74, 76 and the yaw reference visual indication 50 is proportional to the rate of turn of the aircraft. Where the size and spacing of the yaw visual indications 74, 76, 78 are uniform, the number of yaw visual indications 74, 76, 78 is also proportional to the rate of turn. A number of additional dynamic yaw visual indications 78 can appear between the outermost yaw visual indications 74, 76 and the yaw reference visual indication 50. The dynamic yaw visual indications 74, 76, 78 can have a second appearance (e.g., green) to indicate a right turn. The dynamic yaw visual indications 78 are sequentially produced or displayed to create the appearance of constantly indexing generally to the left (as illustrated by arrow 90) to give the pilot the visual impression of a turn to the right.

The dynamic left outermost attitude visual indication 70 is aligned with the horizon 38, spaced relatively above the respective static horizon reference visual indication 58 by a first distance. The dynamic right outermost attitude visual indication 72 is aligned with the horizon 38, spaced relatively above the respective static horizon reference visual indication (64) by a second distance. The pilot can visually determine that the aircraft is banking since the first and the second distances are not equal. The pilot can also visually determine that the bank is toward the right since the outermost attitude visual indications 70, 72 are above the respective horizon reference visual indications 58, 64 and the second distance is less than the first distance. (Note: this rule works for a negative angle of attack, and is opposite that of FIG. 9). Additional attitude visual indications 67, 68 are sequentially produced or displayed between the outermost attitude visual indications 70, 72 and the respective horizon reference visual indications 58, 64 to create the appearance of constantly indexing in a generally upward direction (as illustrated by arrows 92) to give the pilot the visual impression of a descent. The rate of indexing can be proportional to the rate of altitude change.

Figure 13:
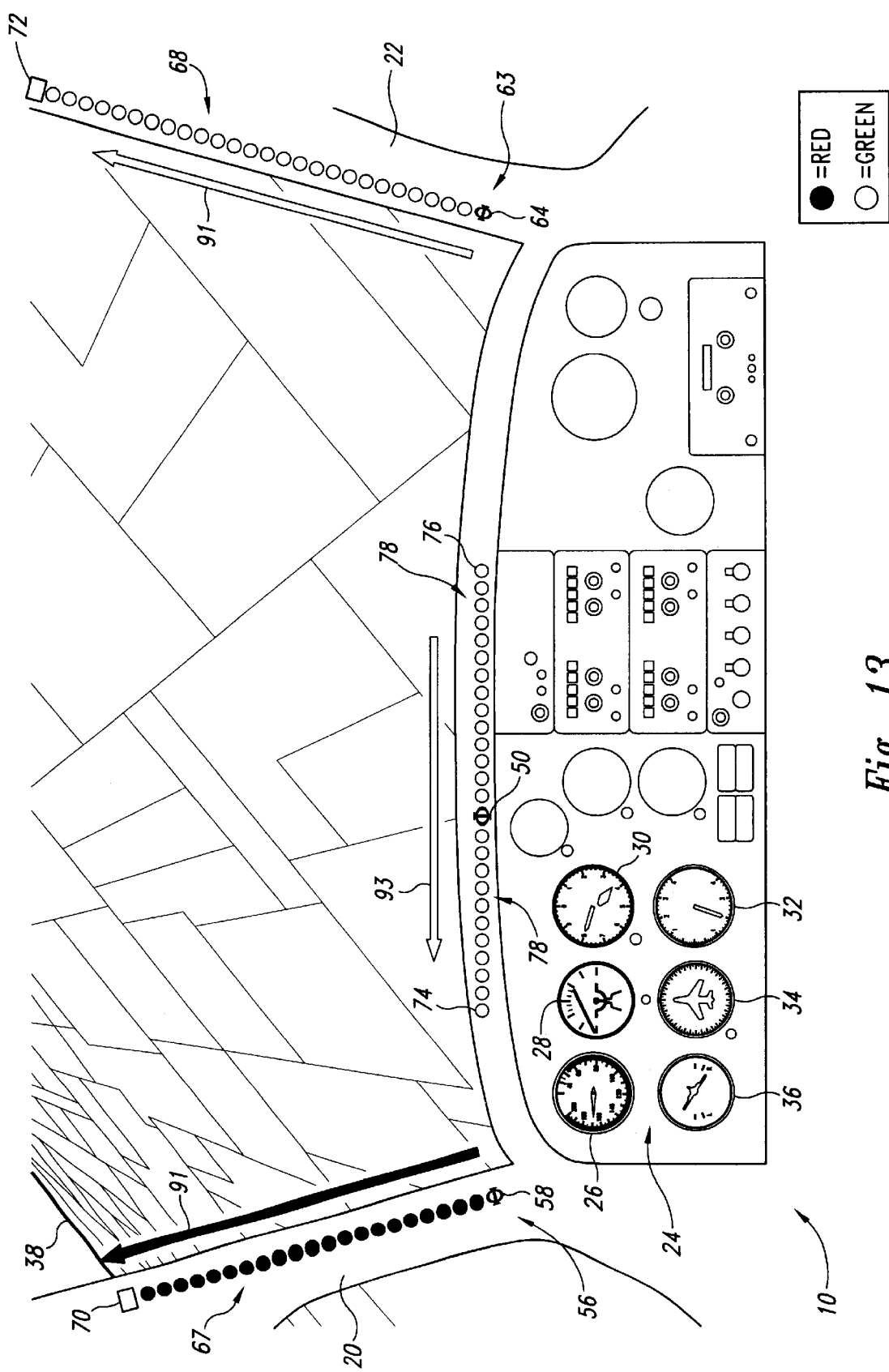
FIG. 13 is a schematic view of the interior of the cockpit of the aircraft during a power-on spiral dive to the right, commonly known as a "graveyard" spiral.

FIG. 13 illustrates the pilot's field-of view from the cockpit 10 of the aircraft during a so-called "graveyard spiral." The flight instruments confirm the dangerous flight conditions, the airspeed indicator 26 indicating dangerously excessive airspeed, the attitude indicator 28 indicating a tight spiraling dive to the right, the altimeter 30 and the vertical speed indicator 32 indicating a rapid descent, the heading indicator 34 and the turn and bank coordinator 36 further confirming a rapid descending spiral to the right.

The outermost attitude visual indications 70, 72 are spaced far above the respective horizon reference visual indications 58, 64. The additional dynamic attitude visual indications 67, 68 index upward (arrows 91) at a rapid rate, indicating a rapid loss of altitude. The outermost yaw visual indications 74, 76 are spaced far to the left and right of the yaw reference visual indication 50. The additional dynamic yaw visual indications 78 index at a rapid rate from right to left (arrow 93), indicating a rapid rate of turning of the aircraft. The rapid rate of indexing of both the dynamic attitude visual indications 67, 68 and the yaw visual indications 78 provides the pilot with a dramatic visual indication that the aircraft is in a spin. The dynamic yaw visual indications 74, 76, 78 are the second color (i.e., green), indicating a turn to the right.

The display of the static and/or dynamic visual indications 58, 60, 62, 64, 66, 67, 68, 50, 52, 54, 78 can be successively interrupted to provide a visual warning to the pilot of some flight condition of particular concern. The flashing of some or all of the current displayed visual indications in the pilot's peripheral field-of-view is particularly calculated to attract attention.

Figure 14:
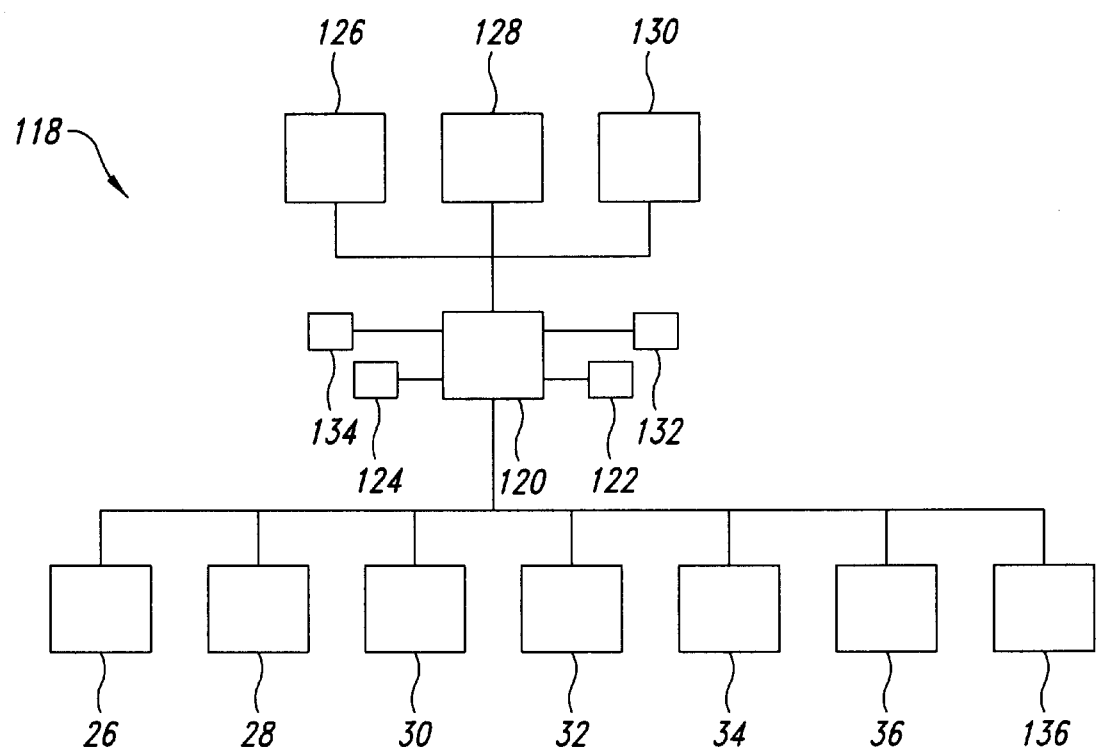
FIG. 14 shows a schematic diagram of a flight information visual display system according to an embodiment of the invention.

For example, the display of all of the currently displayed static and dynamic visual indications can be interrupted in response to the detection of the ground within some defined threshold by a ground proximity detector 136 (FIG. 14). The display can be successively interrupted during the entire period that the ground is within the threshold. The frequency of interruption can be proportional to the proximity of the ground, for example interrupting the display every 5 seconds at 5000 feet, every one second at 1000 feet, and every half second at 500 feet. Other frequencies and frequency distributions are of course possible, including a frequency distribution based on a logarithmic scale.

Also for example, all of the static and/or dynamic indications in a particular area can be displayed to alert the pilot to some flight condition of particular concern. For example, all of the static and dynamic indications 58, 60, 62, 67, 70 of the left side attitude display 56 can be produced to alert the pilot of a danger to the port side of the aircraft, such as another aircraft taxiing toward the aircraft from the port side. All of the static and dynamic indications 64, 66, 68, 72 of the right side attitude display 63 can be produced to alert the pilot of a danger to the starboard side of the aircraft, such as another aircraft taxiing toward the aircraft from the starboard side. All of the static and dynamic indications 50, 52, 54, 74, 76, 78 of the yaw display 48 can be produced to alert the pilot of a danger to the front of the aircraft. Static and dynamic indications of a first color (e.g., red) of both the left attitude display 56 and the right attitude display 63 can be produced to alert the pilot to a danger from below the aircraft, while static and dynamic indications of a second color (e.g., green) alert the pilot to a danger from above the aircraft. These may be sequentially produced to create the appearance of constantly indexing (i.e., marquee) in a generally upward direction for dangers approaching from above, or a generally downward direction for dangers approaching from below the aircraft.

Warning triggers or relevant position data can be generated from instruments on board the aircraft, such as radar or proximity detectors. Alternatively, or additionally, warning triggers or relevant position data can be provided from a source outside the aircraft, such as another aircraft, air traffic controller, ground traffic controller, or other ground based automated systems.

FIG. 14 schematically illustrates an exemplary flight information visual display system 118 to provide visual flight information as described generally above, particularly suited for use with the displays 48, 56, 63 of FIGS. 1–13. The flight instruments of the flight instrument panel 24 including, but not limited to, airspeed indicator 26, attitude indicator 28, altimeter 30, vertical speed indicator 32, heading indicator 34, turn and bank coordinator 36, and ground proximity detector 136 provide measurements to a microprocessor 120 in the form of electrical and/or optical signals. The microprocessor 120 executes a set of instructions stored in a computer-readable media such as random access memory ("RAM") 122, read only memory ("ROM") 124, on board registers or caches, magnetic media such as floppy or hard disks, and/or optical media such as CD-ROM. The microprocessor 120 processes the electrical signals according to the stored instructions, and provides actuating signals to one or more display producing devices.

In the embodiment illustrated in FIG. 14, the flight information visual display system 118 employs three display producing devices, including a left pillar mounted display producing device 126 for producing the left side attitude display 56 (FIG. 1), a center mounted display producing device 128 for producing the yaw display 48 (FIG. 1), and a right pillar mounted display producing device 130 for producing the right side attitude display 63 (FIG. 1). Alternatively, the flight information visual display system 118 can employ a greater or less number of display producing devices, while still producing the left side attitude display 56, the yaw display 48 and the right side attitude display 63. The display producing devices 126, 128, 130 can include a display processor or controller for converting the signals from the microprocessor 120 into specific signals for driving the actual elements of the display producing devices 126, 128, 130. Alternatively, or additionally, the microprocessor 120 can include a device driver for producing specific signals for driving the actual elements of the display producing devices 126, 128, 130.

The static and dynamic visual indications can be produced in any of a variety of manners capable of producing a visual indication within a field-of-view of the pilot, and preferably in the peripheral view of the pilot. For example, the visual indications may be produced by selectively actuable light sources, such as light emitting diodes ("LEDs") or incandescent light bulbs. Thus, for example, the display producing devices 126, 128, 130 can take the form of respective strings of individually actuable lights, such as LEDs mounted to the pillars 20, 22 and above the instrument panel 24, or along the sides of the windshield 16. Alternatively, or additionally, the visual indications may be produced by one or more selectively actuable portions (e.g., pixels) of one or more liquid crystal displays ("LCDs"). For example, by selectively passing and blocking light through selected elements of the LCD, or by selectively reflecting and absorbing incident light by the selected elements. LCD strips can be located on the pillars 20, 22 and between the instrument panel 24 and the windshield 16. Alternatively, or additionally, the visual indications can be produced by one or more individually addressable pixels of a display device such as a cathode ray tube ("CRT"), field emission display ("FED") or plasma display, which can be mounted along the pillars 20, 22 and between the instrument panel 24 and the windshield 16. In yet a further alternative, the visual indicators can take the form of one or more projection devices for producing light impinging on respective portions of the cockpit 10 or windshield 16, and/or screens positioned along the pillars 20, 22 and above the instrument panel 24. Thus, for example, the display producing devices 126, 128, 130 can take the form of three separately controlled lasers oriented to produce light impinging on respective portions of the cockpit 10 or appropriately positioned screens. Thus, the display producing devices 126, 128, 130 can employ any of a variety of technologies to produce the display of flight information including, but not limited to, LED, incandescent, LCD, CRT, FED, and/or lasers.

The flight information visual display system 118 can also include a light level sensor 132 positioned in the cockpit 10 to measure a level of light in the cockpit 10. The microprocessor 120 can receive the measurement from the light level sensor 132, for example, in the form of an analog or digital signal. The microprocessor 120 can select an appropriate intensity for the various visual indications based on the level of light in the cockpit 10 and adjust the display producing devices 126, 128, 130 accordingly. Thus, the flight information visual display system 118 can automatically adjust the intensity of the displays 48, 56, 63 for the cockpit lighting conditions. Such an adjustment can also include producing different color light based on the level of light in the cockpit 10. Alternatively, or additionally, the flight information visual display system 118 can include a switch 134 for manually adjusting the intensity of the displays 48, 56, 63.

FIGS. 15–18 illustrate an alternative embodiment in which flight information is presented on a display panel or screen 100 above the standard instruments. The display 100 may occupy the space between the instrument panel 24 and the windshield 16 (FIG. 1), and does not typically replace the instrument panel 24.

Figure 15:
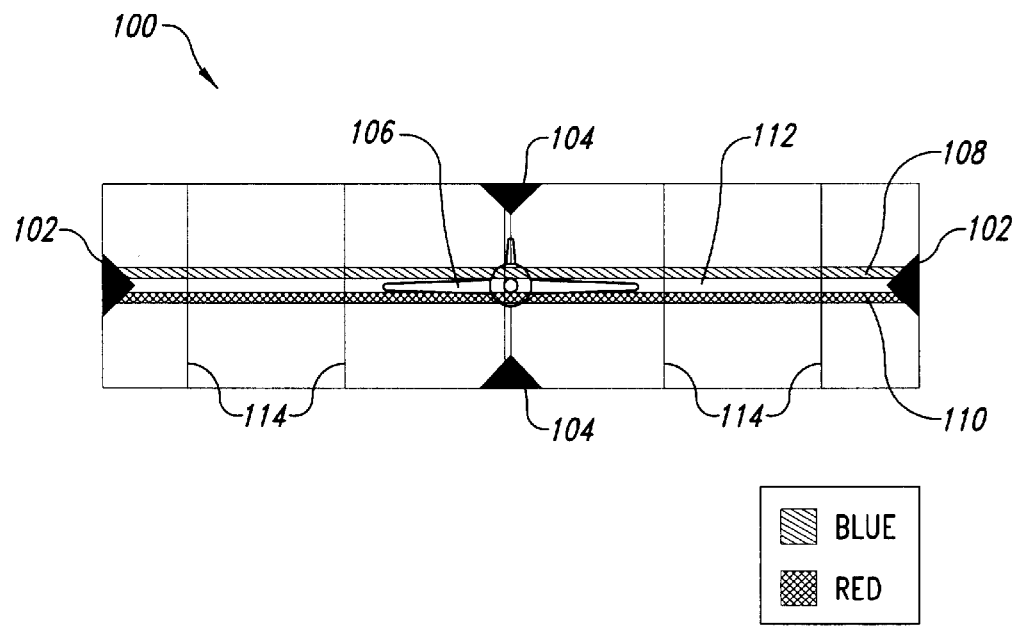
FIG. 15 shows a centralized display displaying visual cues for an aircraft in straight and level flight, according to another embodiment of the invention.

FIG. 15 shows the display 100 as viewed by the pilot, with visual flight information corresponding to a straight and level flight. The display 100 includes opposed horizon reference visual indications 102, opposed vertical reference visual indications 104, and aircraft reference visual indication 106 which may resemble an airplane or other aircraft. The horizon reference visual indications 102, vertical reference visual indications 104 and aircraft reference visual indication 106 are static, and do not change position relative to the display 100, thus providing a set of visual references for the pilot.

The display 100 also includes an upper and a lower horizon delimiter 108, 110, respectively, defining a horizon visual identifier (i.e., space) 112 therebetween. The horizon visual identifier 112 illustrates the true position of the natural horizon 38 (FIG. 1) with respect to the aircraft. The upper horizon delimiter 108 can have a first appearance (e.g., blue) and the lower delimiter 110 can have a second appearance (e.g., red), different from the first appearance. While the horizon visual identifier 112 is illustrated as a white space between the blue upper horizon delimiter 108 and the red lower horizon delimiter 110, the display 100 can present the horizon visual identifier 112 as some third color other than white, to further distinguish the horizon visual identifier 112 from other spaces occurring in the display 100. The upper and lower horizon delimiters 108, 110 are dynamic, capable of moving with respect to the horizon reference visual indications 102, vertical reference visual indications 104, and aircraft reference visual indication 106 in response to the flight conditions of the aircraft.

The display 100 also includes a set of true vertical visual indications 114, extending perpendicularly to the upper and lower horizon delimiters 108, 110. The true vertical visual indications 114 are also dynamic, capable of moving in response to the flight conditions of the aircraft. The true vertical visual indications 114 remain fixed during straight flight, only appearing to move or index laterally across the display in response to the aircraft turning (i.e., yaw).

As can be seen in FIG. 15, the horizon visual identifier 112 is centered on the opposed horizon reference visual indications 102 and on the aircraft reference visual indication 106, and the positions of the upper and lower horizon delimiters 108, 110 are not changing, thus the aircraft is in level flight. The positions of the true vertical visual indications 114 are not changing, thus, aircraft is in straight flight.

Figure 16:
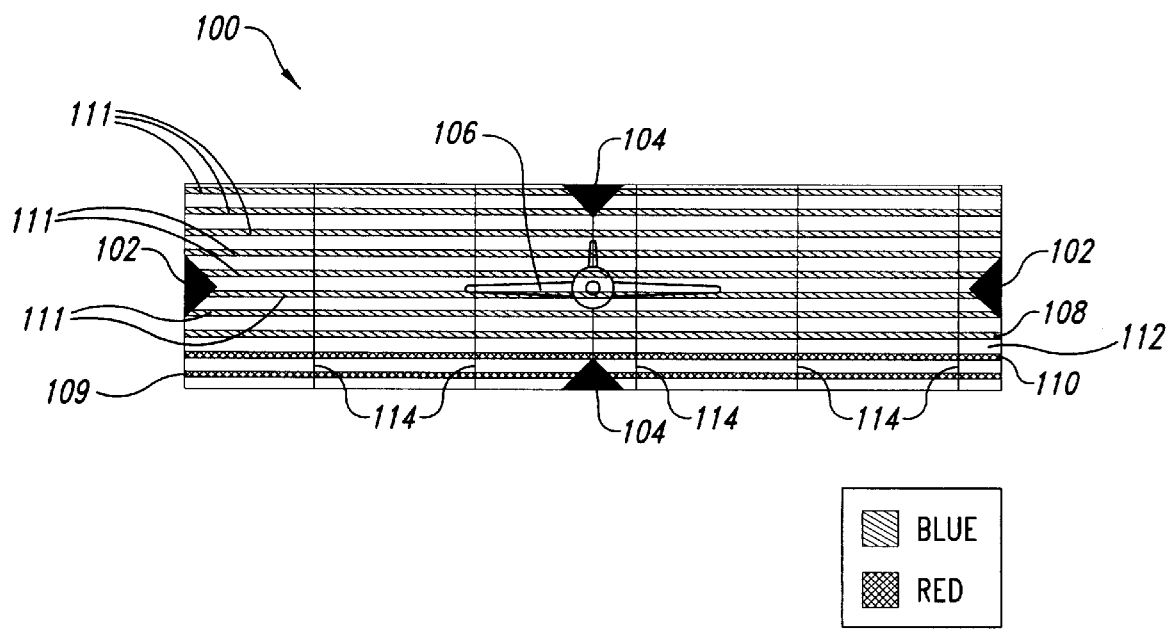
FIG. 16 shows a centralized display displaying visual cues for an aircraft in a straight climb.

FIG. 16 shows the display 100 as viewed by the pilot, with visual flight information corresponding to a straight climb. The level of the true horizon identified by the position of the horizon visual identifier (space) 112, is now spaced relatively below the horizon reference visual indications 102 and the aircraft reference visual indication 106 in proportion to the angle of attack of the aircraft.

In response to the change in aircraft altitude, the display 100 now includes additional lower horizon delimiters 109 and additional upper horizon delimiters 111, which are sequentially produced or displayed to create the appearance of constantly indexing in a generally downward direction to give the pilot the visual impression of climbing. The rate of indexing is proportional to the actual rate of altitude change for the aircraft. As the climb continues, both the lower horizon delimiters 109, 110 and the upper horizon delimiters 108, 111 index downward together. As the upper horizon delimiters 108, 111 reach the level of horizon visual identifier 112 they change appearance, for example turning from blue to red. The continued downward movement of the horizon delimiters 108–111 (e.g., horizontal colored strips) indicates a climb, the level at which each horizon delimiters 108–111 changes appearance (e.g., turns from blue to red) indicates the level of the true horizon, and the rate of climb is indicated by the rate at which the horizon delimiters 108–111 move past the aircraft icon 106. The positions of the true vertical visual indications 114 are not changing, indicting that the aircraft is in straight flight.

Figure 17:
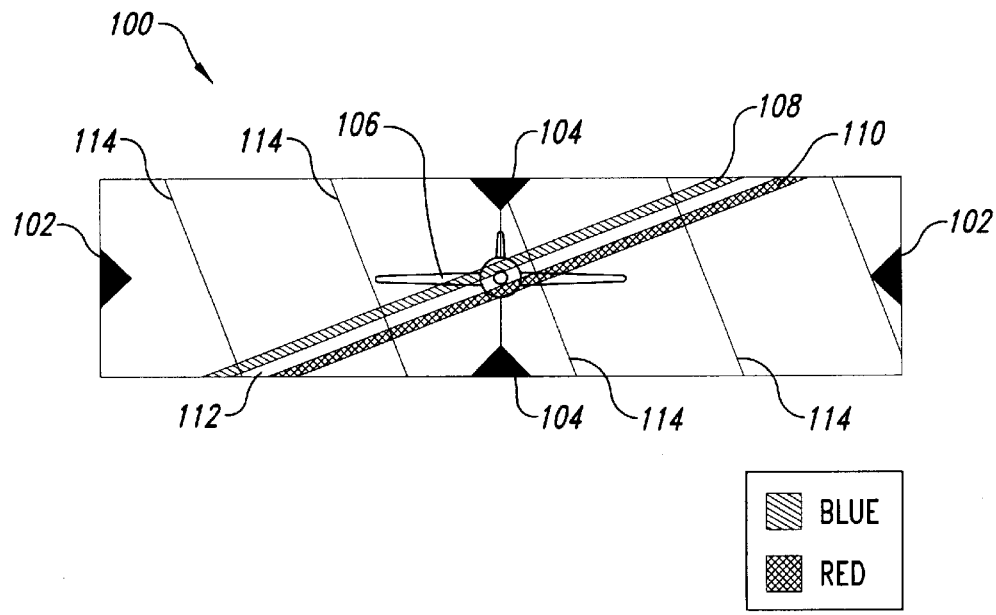
FIG. 17 shows a centralized display displaying visual cues for an aircraft in level turning flight.

FIG. 17 shows the display 100 as viewed by the pilot, with visual flight information corresponding to a level turn to the right. The upper and lower horizon delimiters 108, 110 are slanted or angled with respect to the opposed horizon reference visual indications 102, providing the pilot of a visual impression of the aircraft banking. The slant or angle of the upper and lower horizon delimiters 108, 110 is proportional to the actual bank of the aircraft. The true vertical visual indications 114, which remain perpendicular to the upper and lower horizon delimiters 108, 110, are likewise slanted or angled with respect to the opposed vertical reference visual indications 104, further providing the pilot with the visual impression of the aircraft banking. The true vertical visual indications 114 are sequentially produced or displayed to create the appearance of constantly indexing laterally across the display 100 from right to left, to give the pilot the visual impression of turning to the right. Since the aircraft is not changing altitude, the horizon visual identifier 112 remains centered on the aircraft reference visual indication 106, and the display does not include any additional lower or upper horizon delimiters 109, 111.

Figure 18:
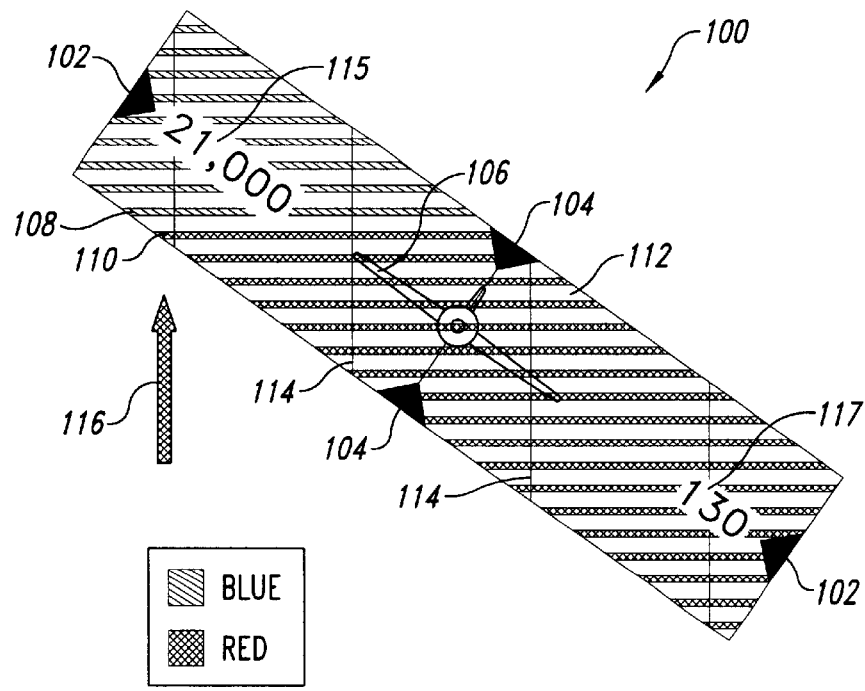
FIG. 18 shows a centralized display displaying visual cues for an aircraft in a "graveyard" spiral.

FIG. 18 shows the display 100 as viewed by the pilot, with visual flight information corresponding to a "graveyard" or diving spiral to the right. The display 100 is oriented in this figure as is exists in the imagination of a pilot properly oriented to the external real world. The upper and lower horizon delimiters 108, 110 are sequentially produced or displayed to create the appearance of constantly indexing in a generally upward, right to left direction indicated by arrow 116 to give the pilot the visual impression of descending. The rate of indexing is proportional to the actual rate of altitude change for the aircraft. As the lower horizon delimiters 109, 110 appear to pass the horizon visual identifier 112, their appearance (e.g., red) changes to that of upper horizon delimiters 108, 111; (e.g., blue). Thus, it appears to the pilot that each horizon delimiter 108–111 increments up and laterally across the display, changing color after passing through the horizon visual identifier 112. The true vertical visual indications 114 are sequentially produced or displayed to create the appearance of constantly indexing in a generally right to left direction to give the pilot the visual impression of a turn to the right, at a rate proportional to the rate of turn. The rapidly indexing turn and descent indications alert the pilot to the spin in an attention attracting manner.

The display 100 can also include a continuous visual numeric representation of the altitude 115 and airspeed 117 of the aircraft, which can be particularly convenient in the dangerous flight conditions such as a graveyard spiral. The visual numeric representation of the altitude 115 and/or airspeed 117 of the aircraft can employ different colors. For example, a red numeric representation of altitude 115 can designate decreasing altitude and a green numeric representation of altitude 115 can designate increasing altitude. Additionally, or alternatively, the display 100 can include a continuous visual numeric representation of the heading (not shown). The visual numeric representation of the heading can employ different colors, for example red to designate a heading change toward the port side of the aircraft and green to designate a heading change toward the starboard side. The flight information visual display system 118 can employ a similar approach for a visual representation of banking of the aircraft (not shown), for example, designating a banking of the aircraft to port or left using red and designating a banking to the right or starboard using green. The use of other, and/or additional colors are of course possible.

While generally illustrated as solid lines in FIGS. 15–18, the upper and lower horizon delimiters can take another form or shape. For example, the upper and lower horizon delimiters 108, 110 can take the form of broken, dotted or otherwise segmented lines, including segments of different colors. The indexing of the true vertical visual indications 114 across the segmented upper and lower horizon delimiters 108, 110 will further enhance the appearance of drift to the right or left of the display 100, reinforcing the visual impression of a turn.

Figure 19:
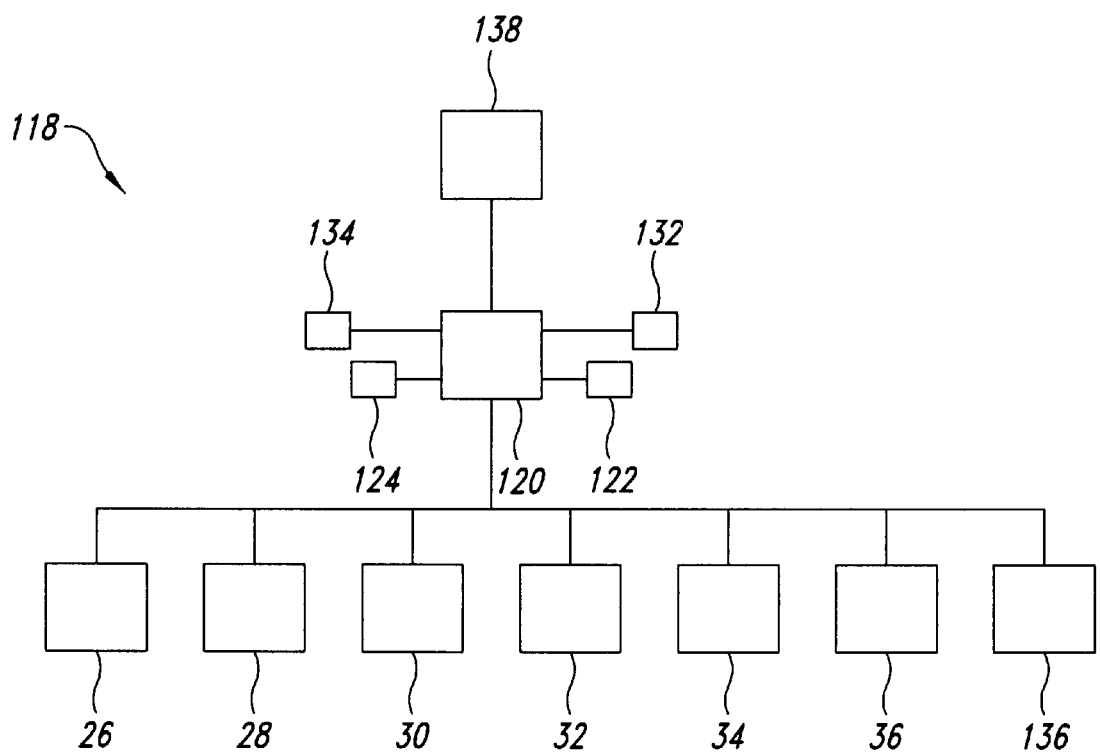
FIG. 19 shows a schematic diagram of a flight information visual display system according to an another embodiment of the invention.

FIG. 19 schematically illustrates an alternative exemplary flight information visual display system 118 to provide visual flight information as described generally above, particularly suitable for use with the display 100 of FIGS. 15–18. The flight information visual display system 118 of FIG. 19 is substantially similar to the flight information visual display system 118 of FIG. 14, but employs a single display producing device 138, such as an LCD, CRT, FED display panel.

Although specific embodiments and examples of the invention are described herein for illustrative purposes, various equivalent modifications can be made without departing from the spirit and scope of the invention, as will be recognized by those skilled in the relevant art. The teachings provided herein of the invention can be applied to other aircraft, other display systems and other visual indications, not necessarily the flight information display system described above. The visual indications can take a variety of shapes, forms and colors. As generally discussed above, the visual indications can be produced by any of a variety of means. Further, the flight information visual display system can employ more than one microprocessor, and can also employ other elements conventional in computer architecture. The flight instruments can include additional and/or different instruments, for example an omnirange receiver, radio transceiver, transponder, and/or radar. The inclusion and/or substitution of other flight instrumentation and other computer hardware elements will be recognized by those skilled in the relevant arts.

Commonly assigned U.S. patent application Ser. No. 60/311,021, filed Aug. 8, 2001, and entitled "FLIGHT POSITION DISPLAY SYSTEM" is incorporated herein by reference in its entirety.

The various embodiments described above and in the applications and patents incorporated herein by reference can be combined to provide further embodiments. The described methods can omit some acts and can add other acts, and can execute the acts in a different order than that illustrated, to achieve the advantages of the invention. The flight information visual display system can be used under conditions other than low or no visibility, such as under Visual Flight Rules ("VFR") conditions, reinforcing the visual connection between the visual cues produced by the visual display system and the real world visual cues.

These and other changes can be made to the invention in light of the above detailed description. In general, in the following claims, the terms used should not be construed to limit the invention to the specific embodiments disclosed in the specification, but should be construed to include all flight information display systems, controllers and processors, actuators, and sensors that operate in accordance with the claims. Accordingly, the invention is not limited by the disclosure, but instead its scope is to be determined entirely by the following claims.

What is claimed is:

1. A flight information visualization system for use in an aircraft, comprising:

a first set of visual indicators extending generally vertically with respect to an interior of the aircraft, the first set of visual indicators including a first static reference indicator, at least a number of the visual indicators on either side of the first static reference indicator being selectively actuable to produce a visual indication;

a second set of visual indicators extending generally vertically with respect to the interior of the aircraft and laterally spaced across a pilot's field-of-view from the first set of visual indicators, the second set of visual indicators including a second static reference indicator, at least a number of the visual indicators on either side of the second static reference indicator being selectively actuable to produce a visual indication; and at least one processor coupled to selectively activate at least some of the visual indicators of the first and the second set of visual indicators, the processor activating one of the indicators in the first set of visual indicators spaced from the first static indicator in a direction and by a distance proportional to a distance between an actual horizon on a first side of the aircraft during a current set of flight conditions and a reference horizon on the first side of the aircraft for a nominal set of straight and level flight conditions as a most distal activated one of the visual indicators in the first set of visual indicators from the first static indicator and activating one of the visual indicators in the second set of visual indicators spaced from the second static indicator in a direction and by a distance proportional to a distance between the actual horizon on a second side of the aircraft during the current set of flight conditions and the reference horizon on the second side of the aircraft for the nominal set of straight and level flight conditions as a most distal activated one of the visual indicators in the second set of visual indicators from the second static indicator.

2. The flight visualization system of claim 1 wherein the first and the second static visual indicators are positioned within the aircraft such that an axis extending between the first and the second static visual indicators is approximately aligned in the pilot's field-of-view with a position of the horizon under the nominal set of straight and level flight conditions.

3. The flight visualization system of claim 1 wherein the processor activates a number of visual indicators between the first static indicator and the most distal activated one of the activated indicators in the first set of visual indicators and activates a number of visual indicators between the second static indicator and the most distal activated one of the activated indicators in the second set of visual indicators.

4. The flight visualization system of claim 1 wherein the most distal activated one of the visual indicators in each of the first and the second sets of visual indicators from the respective first and second static indicators produces an indication different from any more proximate activated ones of the visual indicators in each of the first and the second sets of visual indicators.

5. The flight visualization system of claim 1 wherein the processor sequentially activates the visual indicators between the first static indicator and the most distal activated one of the visual indicators in the first set of visual indicators and the visual indicators between the second static indicator and the most distal activated one of the visual indicators in the second set of visual indicators in a generally downward direction with respect to the interior of the aircraft during a climb of the aircraft and in a generally upward direction with respect to the interior of the aircraft during a descent of the aircraft.

6. The flight visualization system of claim 1 wherein the processor sequentially activates the visual indicators between the first static indicator and the most distal activated one of the visual indicators in the first set of visual indicators and the visual indicators between the second static indicator and the most distal activated one of the visual indicators in the second set of visual indicators at a rate proportional to a rate of change in altitude for the aircraft.

7. The flight visualization system of claim 1, further comprising:

a third set of visual indicators extending generally horizontally with respect to the interior of the aircraft, the third set of visual indicators including a third static reference indicator, wherein the processor is coupled to selectively activate at least some of the visual indicators of the third set of visual indicators, the processor activating at least one of the visual indicators in the third set of visual indicators spaced from the third static indicator by a distance proportional to a rate of turn of the aircraft, as a most distal activated one of the visual indicators in the third set of visual indicators.

8. The flight visualization system of claim 1, further comprising:

a third set of visual indicators extending generally horizontally with respect to the interior of the aircraft, the third set of visual indicators including a third static reference indicator, wherein the processor is coupled to selectively activate at least some of the visual indicators of the third set of visual indicators to produce a first indication for a turn in a first direction and a second indication for a turn in a second direction, different from the first direction.

9. The flight visualization system of claim 1, further comprising:

a third set of visual indicators extending generally horizontally with respect to the interior of the aircraft, the third set of visual indicators including a third static reference indicator, wherein the processor is coupled to selectively activate at least some of the visual indicators of the third set of visual indicators, the processor activating at least one of the visual indicators in the third set of visual indicators spaced from the third static indicator by a distance proportional to a rate of turn of the aircraft, as a most distal activated one of the visual indicators in the third set of visual indicators, the processor successively activates the visual indicators between the third static indicator and the most distal activated ones of the visual indicators in the third set of visual indicators in a generally right to left direction with respect to the interior of the aircraft during a turn to the right of the aircraft and in a generally left to right direction with respect to the interior of the aircraft during a turn to the left of the aircraft.

10. The flight visualization system of claim 1 wherein the visual indicators are light sources.

11. The flight visualization system of claim 1 wherein the visual indicators are elements of a display screen.

12. The flight visualization system of claim 1 wherein the static visual indicator is selectively activated by the processor.

13. The flight visualization system of claim 1 wherein the static visual indicator is not selectively activated by the processor.

14. The flight visualization system of claim 1, further comprising:
 a light level detector positioned to detect a level of light in the interior of the aircraft and coupled to provide a light intensity signal to the processor to automatically adjust an intensity of at least some of the visual indicators.

15. The flight visualization system of claim 1 wherein the microprocessor is coupled to receive a warning indication signal and configured to successively activate and deactivate at least some of the visual indicators in response to the warning indication signal.

16. A peripheral visualization system for displaying flight information in an aircraft, comprising:
 a first set of visual indicators extending along one approximately vertical side of a windshield of the aircraft including a first level flight visual indicator;
 a second set of visual indicators extending along another approximately vertical side of the windshield of the aircraft, including a second level flight visual indicator, the first and the second static visual indicators in approximate registration with a reference horizon in a field-of-view from the aircraft, the visual indicators of the first and the second sets of visual indicators selectively activated such that an imaginary line extending between an outermost activated one of the indicators from each of the first and the second sets of visual indicators is in approximate registration with an actual horizon in a defined field-of-view through the windshield of the aircraft; and
 a third set of visual indicators extending along one approximately horizontal side of the windshield of the aircraft, including a centerline visual indicator, the visual indicators of the third set of visual indicators selectively activated such that a distance between an outermost activated one of the third set of visual indicators on either side of a centerline is proportionate to a rate of turn of the aircraft.

17. The peripheral visualization system of claim 16, further comprising:
 a set of flight sensors to produce flight information corresponding to a set of current flight conditions for the aircraft; and
 a processor coupled to receive the flight information from the set of flight sensors and configured to activate at least some of the visual indicators of the first, the second and the third sets of visual indicators.

18. The peripheral visualization system of claim 16 wherein the visual indicators between a straight and level visual indicator and the outermost activated visual indicator in the first set of visual indicators are sequentially activated from top-to-bottom from a pilot perspective during a climb of the aircraft at a rate proportional to a rate of climb of the aircraft, and from bottom-to-top from the pilot perspective during a descent of the aircraft at a rate proportional to a rate of descent of the aircraft.

19. The peripheral visualization system of claim 16 wherein the visual indicators in the third set of visual indicators provide a first indication for a turn of the aircraft in a first direction and a second indication different than the first indication for a turn of the aircraft in a second direction, different from the first direction.

20. The peripheral visualization system of claim 16 wherein the visual indicators between the centerline and the outermost activated visual indicators in the third set of visual indicators are sequentially activated in a direction from right-to-left from a pilot perspective during a turn to the right of the aircraft, and from left-to-right from the pilot perspective during a turn to the left of the aircraft.

21. A peripheral visualization system for displaying flight information in an aircraft, comprising:
 means for providing a first static visual indication within a predefined field-of-view from an interior of the aircraft;
 means for providing a second static visual indication within the predefined field-of-view from the interior of the aircraft, the second static visual indication spaced horizontally across the field-of-view from the first static visual indication;
 means for providing a most distal first dynamic visual indication spaced vertically from the first static visual indication by a distance proportionate to a distance between an actual horizon on a first side of the field-of-view from the interior of the aircraft during a current set of flight conditions and a reference horizon on the first side of the field-of-view from the interior of the aircraft for a nominal set of straight and level flight conditions; and
 means for providing a most distal second dynamic visual indication spaced vertically from the second static visual indication by a distance proportionate to a distance between an actual horizon on a second side of the field-of-view from the interior of the aircraft during a current set of flight conditions and a reference horizon on the second side of the field-of-view from the interior of the aircraft for a nominal set of straight and level flight conditions.

22. A method of providing visual flight information in an aircraft having an interior, comprising:
 providing a first static visual indication within a predefined field-of-view from the interior of the aircraft;
 providing a second static visual indication within the predefined field-of-view from the interior of the aircraft, the second static visual indication spaced horizontally across the field-of-view from the first static visual indication;
 providing a most distal first dynamic visual indication spaced vertically from the first static visual indication by a distance proportionate to a distance between an actual horizon on a first side of the field-of-view from the interior of the aircraft during a current set of flight conditions and a reference horizon on the first side of the field-of-view from the interior of the aircraft for a nominal set of straight and level flight conditions; and providing a most distal second dynamic visual indication spaced vertically from the second static visual indication by a distance proportionate to a distance between an actual horizon on a second side of the field-of-view from the interior of the aircraft during a current set of flight conditions and a reference horizon on the second side of the field-of-view from the interior of the aircraft for a nominal set of straight and level flight conditions.

23. The method of claim 22 wherein the first dynamic visual indication is vertically spaced above the first static visual indication with respect to the interior of the aircraft.

24. The method of claim 22 wherein the first dynamic visual indication is spaced vertically below the first static visual indication with respect to the interior of the aircraft.

25. The method of claim 22 wherein providing a first static visual indication within a predefined field-of-view from the interior of the aircraft includes aligning the first static visual indication with an approximate position of the reference horizon on a first side of the aircraft in the field-of-view from the interior of the aircraft for a nominal set of straight and level flight conditions.

26. The method of claim 22 wherein providing a most distal first dynamic visual indication includes aligning the first dynamic visual indication with an approximate position of the actual horizon on the one side of the aircraft in the field-of-view from the interior of the aircraft for a set of current flight conditions.

27. The method of claim 22, further comprising:
providing a number of first dynamic visual indications between the first static indication and the most distal first dynamic visual indication, different from the most distal first dynamic indication; and
providing a number of second dynamic visual indications between the second static visual indication and the most distal second dynamic visual indication, different from the most distal second dynamic indication.

28. The method of claim 22, further comprising:
sequentially providing a number of first dynamic visual indications between the first static indication and the most distal first dynamic visual indication in a generally downward direction with respect to the interior of the aircraft during a climb of the aircraft and in a generally upward direction with respect to the interior of the aircraft during a descent of the aircraft; and
sequentially providing a number of second dynamic visual indications between the second static indication and the most distal second dynamic visual indication in a generally downward direction with respect to the interior of the aircraft during a climb of the aircraft and in a generally upward direction with respect to the interior of the aircraft during a descent of the aircraft.

29. The method of claim 22, further comprising:
sequentially providing a number of first dynamic visual indications between the first static indication and the most distal first dynamic visual indication at a rate proportional to a rate of change in altitude for the aircraft; and
sequentially providing a number of second dynamic visual indications between the second static indication and the most distal second dynamic visual indication at a rate proportional to a rate of change in altitude for the aircraft.

30. The method of claim 22, further comprising:
providing a third static visual indication within a predefined field-of-view from the interior of the aircraft;
providing at least one distal dynamic visual indication of a first type spaced horizontally from the third static visual indication for a turn of the aircraft in a first direction; and
providing at least one distal dynamic visual indication of a second type spaced horizontally from the third static visual indication for a turn of the aircraft in a second direction different than the first direction, the second type of dynamic visual indication different than the first type of dynamic visual indication.

31. The method of claim 22, further comprising:
providing a third static visual indication within a predefined field-of-view from the interior of the aircraft; and
providing at least one most distal third dynamic visual indication spaced horizontally from the third static visual indication by a distance proportional to a rate of turn of the aircraft.

32. The method of claim 22 wherein the predefined field-of-view corresponds to peripheral field-of-view from a pilot seat.

33. The method of claim 22, further comprising:
receiving a warning indication signal; and
successively activating and deactivating at least some of the visual indicators in response to the warning indication signal.

34. The method of claim 22, further comprising:
receiving a ground proximity warning indication signal; and
successively activating and deactivating at least some of the visual indicators in response to the ground proximity warning indication signal at a frequency proportional to a distance between the aircraft and the ground.

35. The method of claim 22, further comprising:
receiving a warning indication signal from an instrument onboard the aircraft; and
successively activating and deactivating at least some of the visual indicators in response to the warning indication signal, the visual indicators selected based on a direction of a perceived danger with respect to the aircraft.

36. The method of claim 22, further comprising:
receiving a warning indication signal from a source external to the aircraft; and
successively activating and deactivating at least some of the visual indicators in response to the warning indication signal, the visual indicators selected based on a direction of a perceived danger with respect to the aircraft.

37. A computer readable media storing instructions for causing a computer to display flight information on a number of indicators in an aircraft, by:
providing a first static visual indication within a predefined field-of-view from the interior of the aircraft;
providing a second static visual indication within the predefined field-of-view from the interior of the aircraft, the second static visual indication spaced horizontally across the field-of-view from the first static visual indication;
providing a most distal first dynamic visual indication spaced vertically from the first static visual indication by a distance proportionate to a distance between an actual horizon on a first side of the field-of-view from the interior of the aircraft during a current set of flight conditions and a reference horizon on the first side of the field-of-view from the interior of the aircraft for a nominal set of straight and level flight conditions; and providing a most distal second dynamic visual indication spaced vertically from the second static visual indication by a distance proportionate to a distance between an actual horizon on a second side of the field-of-view from the interior of the aircraft during a current set of flight conditions and a reference horizon on the second side of the field-of-view from the interior of the aircraft for a nominal set of straight and level flight conditions.

38. A method of providing visual flight information in an aircraft having an interior, comprising:

providing a first set of visual indications extending generally vertically with respect to an interior of the aircraft, the first set of visual indications including a first static reference indication and a most distal indication spaced from the first static indication in a direction and by a distance proportional to a distance between an actual horizon on a first side of the aircraft during a current set of flight conditions and a reference horizon on the first side of the aircraft for a nominal set of straight and level flight conditions;

a second set of visual indications extending generally vertically with respect to the interior of the aircraft and laterally spaced across a pilot's field-of-view from the first set of visual indications, the second set of visual indications including a second static reference indication and a distal most indication spaced from the second static indication in a direction and by a distance proportional to a distance between the actual horizon on a second side of the aircraft during the current set of flight conditions and the reference horizon on the second side of the aircraft for the set of straight and level flight conditions; and providing a third set of visual indications extending generally horizontally with respect to the interior of the aircraft, the third set of visual indications including a third static reference indication and a most distal third visual indication on either side of the third static indication, spaced from the third static indication by a distance proportional to a rate of turn of the aircraft.

39. The method of claim 38 wherein providing a first set of visual indications includes sequentially providing visual indications between the first static reference indication and the most distal indication in the first set of visual indications in a top-to-bottom direction during a climb of the aircraft and in a bottom-to-top direction during a descent of the aircraft.

40. The method of claim 38 wherein providing a third set of visual indications includes sequentially providing visual indications between the third static reference indication and the most distal third visual indications in a left-to-right direction during a left turn of the aircraft and in a right-to-left direction during a right turn of the aircraft.

41. A computer readable media storing instructions for causing a computer to display flight information on a number of indicators in an aircraft, by:

providing a first set of visual indications extending generally vertically with respect to an interior of the aircraft, the first set of visual indications including a first static reference indication and a most distal indication spaced from the first static indication in a direction and by a distance proportional to a distance between an actual horizon on a first side of the aircraft during a current set of flight conditions and a reference horizon on the first side of the aircraft for a nominal set of straight and level flight conditions;

a second set of visual indications extending generally vertically with respect to the interior of the aircraft and laterally spaced across a pilot's field-of-view from the first set of visual indications, the second set of visual indications including a second static reference indication and a most distal indication spaced from the second static indication in a direction and by a distance proportional to a distance between the actual horizon on a second side of the aircraft during the current set of flight conditions and the reference horizon on the second side of the aircraft for the set of straight and level flight conditions; and providing a third set of visual indications extending generally horizontally with respect to the interior of the aircraft, the third set of visual indications including a third static reference indication and a most distal third visual indication on either side of the third static indication, spaced from the third static indication by a distance proportional to a rate of turn of the aircraft.

42. A flight information display system for providing flight information in an aircraft, comprising:

a display;

a static horizon reference indicator; and a processor coupled to the display and configured to produce an image on the display including a number of substantially parallel pitch lines, at least a first one of the pitch lines having a first visual characteristic and at least a second one of the pitch lines displayed at a same time as the first pitch line having a second visual characteristic, different from the first visual characteristic, a distance between the horizon reference indicator and an interface between the first and the second pitch lines being proportional to a pitch of the aircraft under current flight conditions, where the pitch lines scroll perpendicularly across the display at a rate proportional to a rate of altitude change of the aircraft, if any.

43. The flight information display system of claim 42 wherein the pitch lines in the image produced by the processor are displayed at an angle to the horizon reference indicator equal to an angle of a bank about a roll axis of the aircraft, if any.

44. The flight information display system of claim 42, further comprising:

a static heading reference indicator wherein the image produced by the processor further includes a number of substantially parallel yaw lines, the yaw lines substantially perpendicular to the pitch lines, where the yaw lines scroll perpendicularly across the display with respect to the static heading reference indicator at a rate proportional to a rate of turn of the aircraft, if any.

45. The flight information display system of claim 42 wherein the first and the second visual characteristics are a first color and a second color, respectively.

46. The flight information display system of claim 42 wherein the static horizon reference indicator is one of an image on the display and a fixed icon next to the display.

47. The flight information display system of claim 42 wherein the pitch lines are segmented.

48. The flight information display system of claim 42, further comprising:

an aircraft icon fixed in a center of the display.

49. A method of providing a display of flight information for an aircraft on a display, comprising:

receiving a set of flight information for the aircraft;

determining a number of successive images based on the received flight information, the images including a number of substantially parallel pitch lines, at least a first one of the pitch lines having a first visual characteristic and at least a second one of the pitch lines having a second visual characteristic in the same image, different from the first visual characteristic, a distance between a horizon reference indicator and an interface between the first and the second pitch lines being proportional to a pitch of the aircraft under current flight conditions; and displaying the determined images.

50. The method of claim 49 wherein determining a number of images based on the received flight information includes determining successive positions of the pitch lines in the images at successive intervals to scroll the pitch lines perpendicularly across the display at a rate proportional to a rate of altitude change of the aircraft, if any.

51. The method of claim 49 wherein determining a number of images based on the received flight information includes canting the pitch lines in the images at an angle to the horizon reference indicator equal to an angle of a bank about a roll axis of the aircraft, if any, under the current flight conditions.

52. The flight information display system of claim 49 wherein determining a number of images based on the received flight information includes determining successive positions of a number of substantially parallel yaw lines substantially perpendicular to the pitch lines at successive intervals in the images to scroll the yaw lines perpendicularly across the display with respect to a static heading reference indicator at a rate proportional to a rate of turn of the aircraft, if any, under the current flight conditions.

53. A computer readable media storing instructions for causing a computer to display flight information on a number of indicators in an aircraft, by:

displaying a number of substantially parallel pitch lines, at least a first one of the pitch lines having a first visual characteristic and at least a second one of the pitch lines displayed at a same time as the first pitch line having a second visual characteristic, different from the first visual characteristic, a distance between a horizon reference indicator and an interface between the first and the second pitch lines being proportional to a pitch of the aircraft under current flight conditions, where the pitch lines scroll perpendicularly across the display at a rate proportional to a rate of altitude change of the aircraft, if any; and displaying a number of substantially parallel yaw lines, the yaw lines substantially perpendicular to the pitch lines, where the yaw lines scroll perpendicularly across the display with respect to a static heading reference indicator at a rate proportional to a rate of turn of the aircraft, if any.

* * * * *